United States Patent [19]
Sheppard, Sr.

[11] Patent Number: 4,484,655
[45] Date of Patent: Nov. 27, 1984

[54] GEARLESS HYDRAULIC TRANSMISSION AND VEHICLE DRIVE SYSTEM

[76] Inventor: Darrel J. Sheppard, Sr., 28751 Delton, Madison Heights, Mich. 48071

[21] Appl. No.: 455,225

[22] Filed: Jan. 3, 1983

Related U.S. Application Data

[62] Division of Ser. No. 165,211, Jul. 1, 1980, Pat. No. 4,373,605.

[51] Int. Cl.³ .......................................... B60K 17/10
[52] U.S. Cl. ..................................... 180/308; 60/431; 180/305
[58] Field of Search ............... 180/305, 307, 308, 132, 180/70 R; 417/34; 60/431, 433, 434, 459, 470

[56] References Cited

U.S. PATENT DOCUMENTS

| | | | |
|---|---|---|---|
| 1,358,974 | 11/1920 | Mowbray | 180/148 |
| 3,173,259 | 3/1965 | Harbridge | 60/53 |
| 3,207,254 | 9/1965 | DeVenel | 180/79.2 |
| 3,305,038 | 2/1967 | Carter | 180/50 |
| 4,076,094 | 2/1978 | Moody et al. | 180/108 |
| 4,121,418 | 10/1978 | Kronogard | 180/70 R |
| 4,132,283 | 1/1979 | McCurry | 180/66 R |

OTHER PUBLICATIONS

Thoms, W., "A Car That Can Store Power", Mechanix Illustrated, Nov. 1977, p. 60.

Primary Examiner—Joseph F. Peters, Jr.
Assistant Examiner—Donn McGiehan
Attorney, Agent, or Firm—Gifford, VanOphem, Sheridan, Sprinkle & Nabozny

[57] ABSTRACT

A gearless transmission providing pressurized hydraulic fluid to torque motors for driving a vehicle. A hydraulic pump is driven by a turbine engine shaft to provide fluid to accumulators and then to the transmission device. Fluid is selectively admitted into the transmission by the vehicle accelerator pedal. Thereafter the fluid flow may be restricted through fluid circuitry having orifices which provide variable torque output. The circuitry is controlled by a shifter selector with pilot lines to actuate fluid control valves between two control positions. Especially important for turbine-powered vehicles, the transmission provides a braking function when the accelerator pedal is released in either the low or second control range of operation. Means for providing a reverse mode of operation is also disclosed.

A hydraulic differential is also provided and is controlled by the steering mechanism to restrict flow to one of the torque motors during a turn, while increasing the flow to the other wheel a corresponding amount.

A hydraulic positive traction device is also provided and substantially reduces flow to a torque motor when a wheel is spinning such as in snow or loose gravel.

A hydraulic pilot line valve is also provided to direct pressurized fluid for movement of spool valves in a hydraulic circuit line.

6 Claims, 27 Drawing Figures

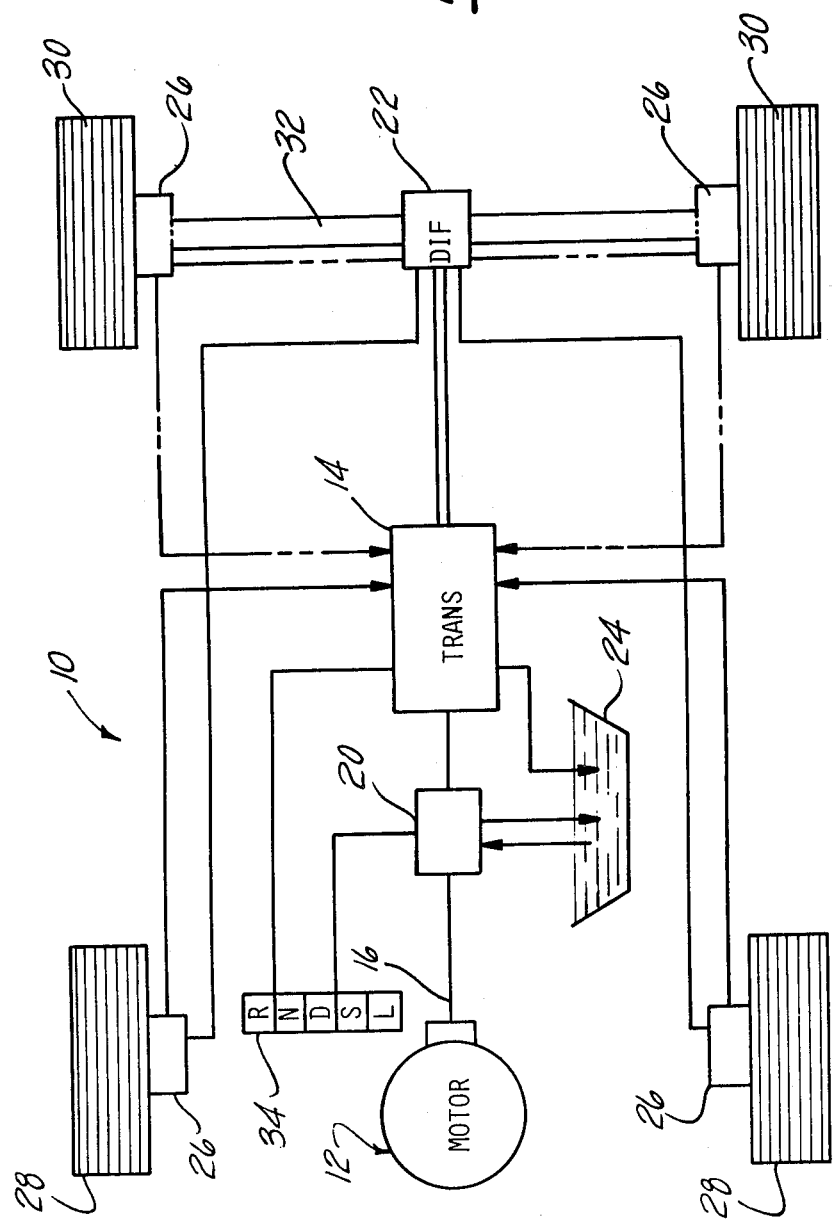

NEUTRAL POSITION

NEUTRAL POSITION

LOW POSITION

LOW POSITION
LEFT WHEEL SPIN

LOW POSITION ACCELERATOR DEPRESSED

LOW POSITION ACCELERATOR RELEASED

DRIVE-LOW POSITION

DRIVE-LOW POSITION
LEFT TURN

SECOND POSITION

SECOND POSITION
RIGHT WHEEL SPIN

SECOND POSITION ACCELERATOR DEPRESSED

SECOND POSITION ACCELERATOR RELEASED

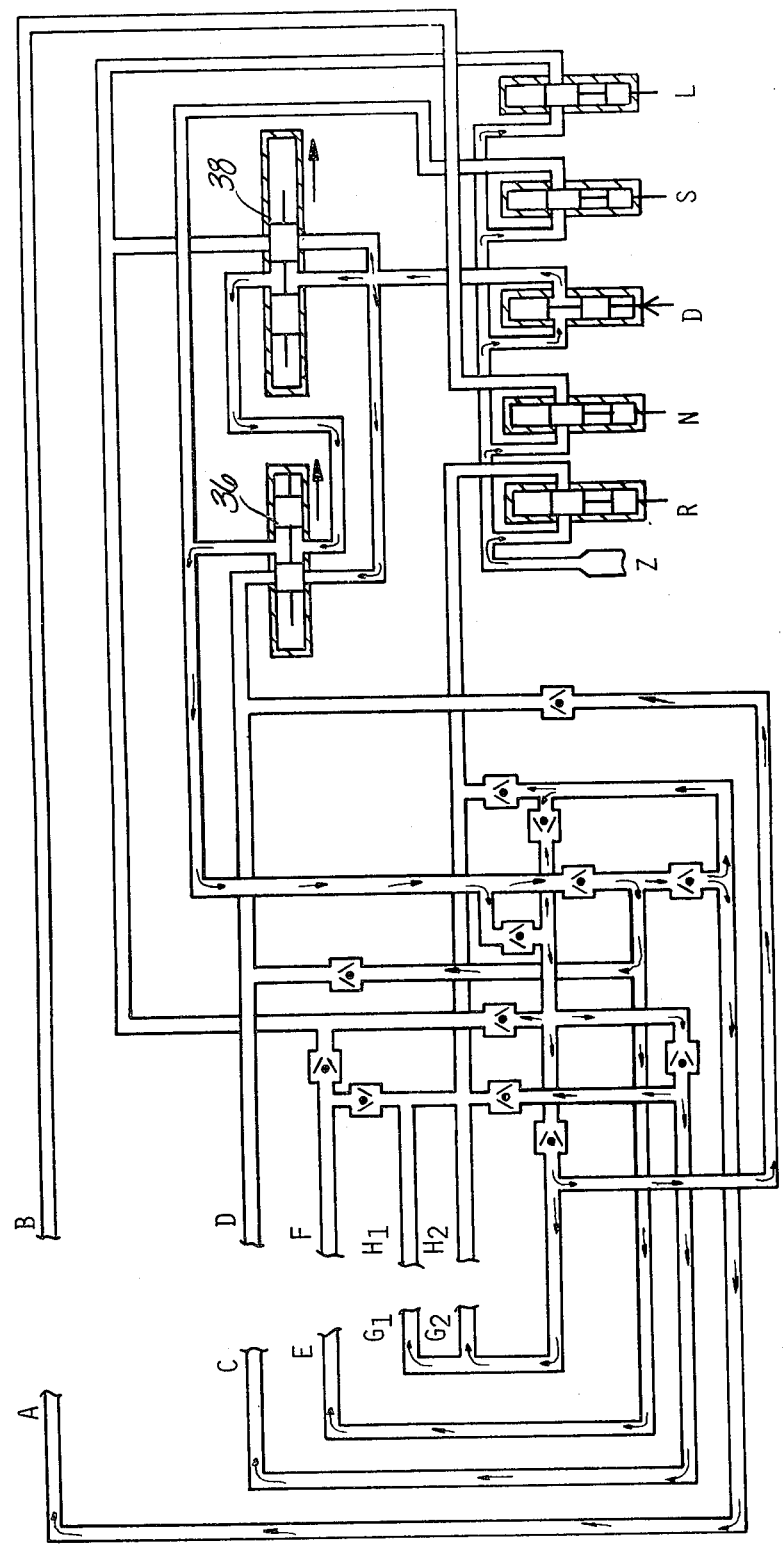

DRIVE-SECOND POSITION
RIGHT TURN

DRIVE-HIGH POSITION

DRIVE-HIGH POSITION

HIGH POSITION ACCELERATOR DEPRESSED

HIGH POSITION ACCELERATOR RELEASED

REVERSE POSITION

REVERSE POSITION

REVERSE POSITION ACCELERATOR DEPRESSED

REVERSE POSITION ACCELERATOR RELEASED

GEARLESS HYDRAULIC TRANSMISSION AND VEHICLE DRIVE SYSTEM

This application is a division of application Ser. No. 165,211, filed July 1, 1980, now U.S. Pat. No. 4,373,605.

BACKGROUND OF THE INVENTION

I. Field of the Invention

This invention pertains to mechanisms and systems for propelling an automobile having an engine with an output shaft. This invention also relates to hydraulic fluid systems, valves for such systems, and motors/pumps which are driven by or drive a rotating element by the force of hydraulic fluid pressure.

II. Description of the Prior Art

Machines driving a rotating driven element, especially automobiles have in the past employed a totally mechanical system for propulsion. Gears have been employed in both manual and automatic hydraulic transmissions to vary the torque output from the engine to the driven wheels. The invention discussed below represents a novel departure from this concept.

It has also become recently known that it is possible to drive a vehicle or other machine having rotating driven elements or wheels by the use of torque motors receiving fluid under pressure from a fluid pump. An especially good example of such vehicles and hydraulic drive systems is discussed in the November, 1977 issue of Mechanix Illustrated, pages 60–62, 151. However, for such propulsion systems of an automobile or other machine, there has been no control of the range of operation as is available with an automatic hydraulic transmission or a conventional manual transmission which varies the torque output from the engine by varying the gear ratio in the transmission. Since there is no control of the range of operation, the speed of the vehicle is limited since increased speed is achieved only by ever-increasing revolutions of the engine. Engine limitations and, likewise, limitations of the torque motors driving the wheels of such a vehicle necessarily limit the operation of the vehicle. Among other problems, the driving hydraulic fluid heats to dangerous temperatures under such circumstances.

A related problem in the prior art deals with turbine engines and the like used for driving automobiles. Such engines are known to have good efficiency at high constant rates of revolutions but significantly decreased efficiency when the rate of revolutions must be varied between a high and low operating point such as is necessary with an automobile. Significantly, it has been difficult to brake vehicles with turbine engines and a great number of devices have been directed to accomplishing the braking without generating excessive heat.

An exception to the type of engine discussed above is the ram jet engine disclosed in my copending U.S. patent aplication Ser. No. 142,022. The engine disclosed therein preferably uses water in the combustion chamber to take advantage of excessive heat of combustion.

The invention disclosed below is especially useful for overcoming the problem of braking vehicles having such engines since the driving torque motors act as braking pumps when unpressurized fluid is delivered to them.

Another significant problem with conventional vehicle drive systems is the loss of power between production in the engine and use at the driven wheels. This loss of power is inherent with conventional geared transmissions and is attributed chiefly to friction forces. Conventional geared transmissions typically transmit as little as 40% of the power supplied by the engine. It is generally accepted that hydraulic systems, on the other hand, are extremely power efficient. The problem of power loss is greatly diminished by use of the invention described below.

These and other problems of the prior art have been overcome by my invention discussed below and explained by means of a preferred embodiment.

SUMMARY OF THE INVENTION

The present invention is directed to the problem of providing a high efficiency drive system for automobiles and other machines. The invention comprises a hydraulic pump drawing fluid from a reservoir and delivering it to the torque varying means of the transmission and to torque motors operatively connected to the driven wheels of the vehicle. The transmission means comprises fluid circuitry communicating fluid under pressure from the pump to the torque motors and return lines delivering the fluid from the torque motors back to the reservoir. Fluid control spool valves are appropriately positioned within the lines communicating the pump and torque motors so that the fluid is selectively admitted to the torque motors for driving the vehicle.

The valves within the fluid control circuit are controlled by the accelerator of the vehicle, the speedometer of the vehicle, and a transmission selector equivalent to a gear shift lever or push button transmission.

When the accelerator is depressed, pressurized fluid is supplied to the drive motors through various circuit flow routes controlled by the controlling spool valves. Various size restrictions in the various flow paths allow greater or lesser amounts of fluid to pass through the torque motors in accordance with the control range and torque output required by the speed of the vehicle. In this manner, the rate of revolution of the engine output shaft and necessarily the engine may vary within a conventional range while the rate of fluid flow to the torque motor and thereby the torque output, may be gradually decreased as the requirements for propulsion of the vehicle are decreased. That is, the rate of pressurized fluid flow to the torque motors may be decreased in a series of control ranges as the vehicle comes up to speed. Thus, just as a conventional automobile decreases the torque output to the driven wheels by shifting gears, the fluid circuitry of the present invention changes control ranges by recirculating an increasing amount of fluid to the torque motors by means of appropriate recirculation flow paths and control spool valves.

Although the term spool valves is used herein, it should be recognized that equivalent means are also possible for directing and restricting the fluid flow in the circuitry of the present invention.

The control means of the present invention is disclosed as control spool valves operated on a pilot pressure system with fluid from the hydraulic pump. Of course, it would be possible to use a separate electrical system with solenoids, for example, to control the position of the spool valves in the circuitry of the fluid flow paths.

Especially important in the operation of the circuitry means of the hydraulic device of the present invention are restrictive orifices or the equivalent which limit the flow of fluid to and from the torque motors according to predetermined parameters after the fluid has been selectively admitted to the circuitry means from the hydraulic fluid pump. It should be understood that these orifices are represented by a preferred embodiment disclosed below but their equivalent and improved means are also possible such as, for example, where a fixed size orifice may be replaced by an electrically or hydraulically controlled device with a variable orifice opening.

Of course, it should also be recognized that the number of control ranges for varying the torque output to the driving torque motors may be set according to the requirements of the vehicle or other machine using the system of the present invention. Thus, just as a conventional passenger car transmission has three to five gears, the present invention may have three to five control ranges for the torque output to the drive motors by provision of suitable circuit flow paths and control spool valves operatively controlled by the transmission selector device whether push button, shift lever, or other device.

Suitable circuit flow paths and suitable control spool valves are provided to reverse the direction of flow to the driving torque motors so that the vehicle may be driven in either a forward or reverse mode.

Also provided according to the present invention is a positive traction device which restricts the flow of hydraulic fluid to either the right or left-hand driven wheel while allowing full flow to the corresponding opposite wheel so as to apply increased torque to the driven wheel which meets resistance. This is accomplished by the provision of appropriate control spool valves which are in turn controlled by pilot hydraulic lines or the equivalent which sense that one of a pair of driven wheels is rotating at a substantially increased rate over the other driven wheel.

Also provided with the present invention is a control spool valve and circuit means for increasing the pressurized fluid flow to one of a pair of drive wheels while simultaneously decreasing the pressurized fluid flow by a corresponding amount to the other of a pair of drive wheels thereby providing a differential device when a vehicle is turning.

It is possible to provide on a vehicle, torque motors for the front wheels, the rear wheels, or both, thereby providing four-wheel drive. It will be recognized that it is a relatively simple task to provide shut-off valves in the flow and return lines to and from torque motors such that either the rear wheels or front wheels may be selected for driving the four-wheel vehicle. Notably, this has been a troublesome area with four-wheel drive vehicles having transmissions and drive systems of conventional design. The present invention facilitates adaptation of the four-wheel drive type vehicle in a relatively inexpensive manner by merely providing a free wheeling circuit for the torque motors when the fluid flow circuitry to either the front or rear driven wheels has been closed by appropriate shut-off valves. Thus, the present invention represents an improvement over the prior art in this area.

A pilot hydraulic system and control range push button control system are also disclosed herein for cooperation with the vehicle drive and transmission system of the present invention.

A novel fluid control valve is disclosed which is fluidly connected to three hydraulic lines. An internal check mechanism is biased by a spring or similar device. When fluid pressure is transmitted to the first line, pressure is in turn transmitted from the first to the second line so as to move an associated part such as a spool valve. When the associated part is moved in an opposite direction by another source, such as another of the novel valves at the opposite end of the spool valve, fluid in the second line is dumped to the third line. In the latter step, the first line is sealed by the force of the spring.

A hydraulic differential is also disclosed herein for simultaneously increasing the flow of fluid to one of a right or left torque motor, while decreasing the flow of fluid to the other of the motors. Preferably, the flow is directed by a spool valve disposed in the fluid lines between the motors and the pump and reservoir.

It is, therefore, an object of the present invention to provide a hydraulic drive system and transmission for a vehicle and other machines having a rotating driven element.

It is also an object of the present invention to provide a vehicle drive and range control hydraulic fluid system including circuitry having spool valves disposed therein for the control and restriction of fluid to drive motors operatively connected to the driven wheels of a vehicle.

It is also an object of the present invention to provide fluid flow circuitry for the hydraulic fluid drive system and range control system described above, which circuitry provides a differential device for increasing the fluid flow to one of a pair of driven wheels while simultaneously decreasing the fluid flow to the other of said pair of driven wheels by a corresponding amount.

It is also an object of the present invention to provide fluid circuit control means for shutting off the flow of pressurized fluid to a torque motor revolving at a relatively high rate when the corresponding opposite torque motor is not revolving and to simultaneously provide pressurized fluid to the torque motor that is not revolving thereby providing a positive traction device.

It is also an object of the present invention to provide a push button transmission device operatively connected to the control spool valves of the fluid circuit means for varying the output to the drive motors of a vehicle.

It is also an object of the present invention to provide a fluid flow control valve in an environment wherein the valve is fluidly communicating with the hydraulic fluid lines.

It is also an object of the present invention to provide a hydraulic differential for hydraulic drive systems for a vehicle and other machines having rotating driven elements. Various other features and options of the present invention will be described below in conjunction with the drawings and description of a preferred embodiment of the invention. A better understanding of the invention will be had upon a reading of the description provided below in conjunction with the drawing figures.

BRIEF DESCRIPTION OF THE DRAWINGS

FIG. 1 is a schematic diagram of a vehicle employing the transmission and differential of the present invention in a four-wheel drive environment;

FIG. 4E shows the shifter mechanism in the drive position with the associated spool valves shifted to correspond to the second control range of the present invention;

DESCRIPTION OF THE PREFERRED EMBODIMENTS

Figure 2A:
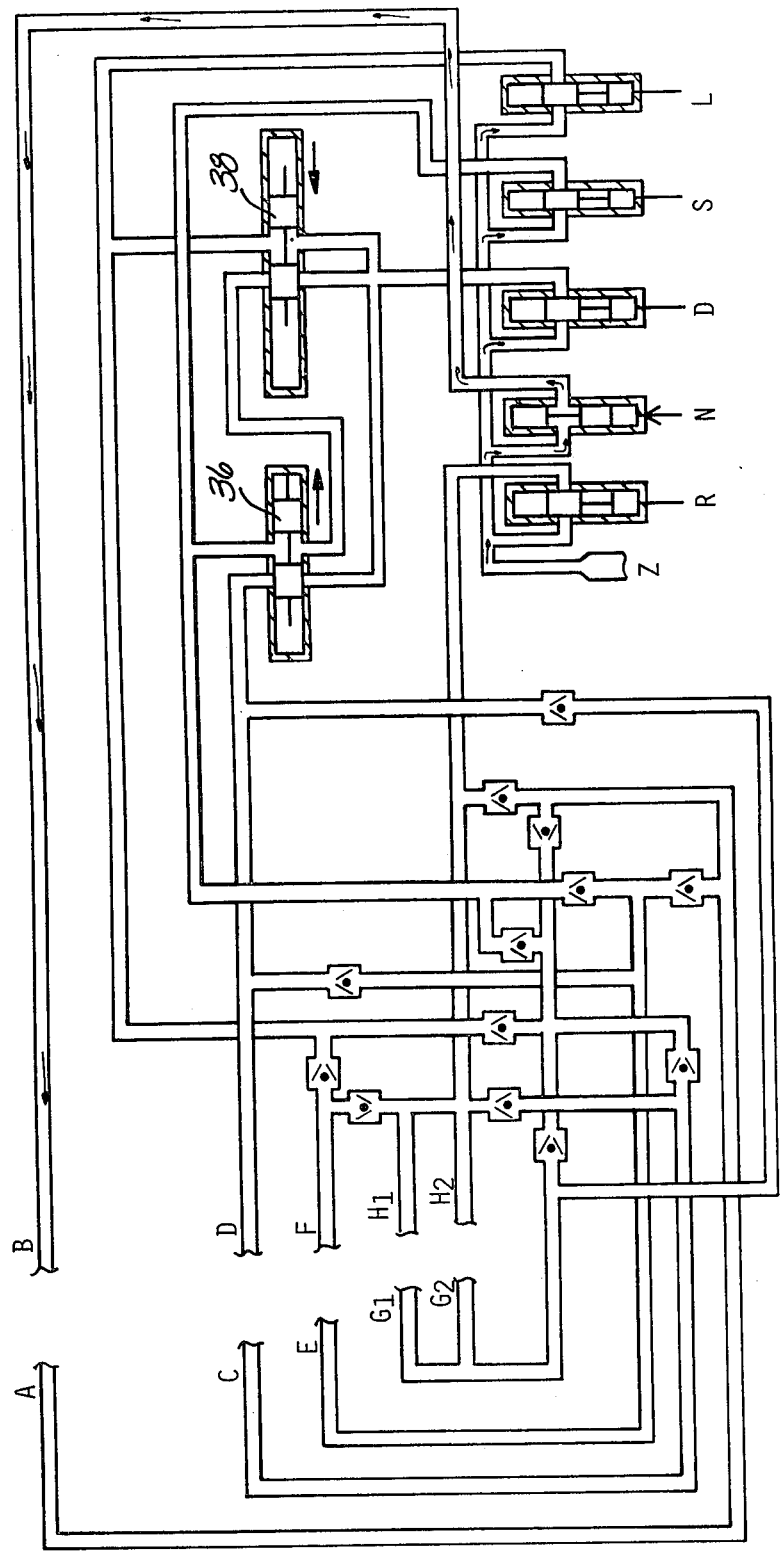
FIG. 2A shows the push button transmission selectors and shifting system including hydraulic pilot circuitry in the neutral position.

FIG. 1 is a schematic view of an automobile 10 having a motor 12, preferably of the turbine engine type to more fully take advantage of the transmission device 14 of the present invention. A rotating drive shaft 16 operates a hydraulic pump 20 associated with the transmission 14 and differential device 22 of the present invention. A reservoir 24 contains a sufficient supply of hydraulic fluid of suitable quality for use in a vehicle at pressures necessary to drive the vehicle. Torque motors 26 are associated with each of the front wheels 28 and rear wheels 30. Pressurized fluid and fluid return lines are associated with each torque motor 26 to receive fluid under pressure from the transmission device 14 and return it through the device 14 to the reservoir 24.

A rear axle 32 is shown as connecting the rear wheels 30 but is not required in some embodiments of the present invention. In some embodiments of the invention, however, it is advantageous to provide a "two-speed axle" or equivalent device between the torque motors and the driven wheels so as to reduce the rate of revolution of the torque motors in comparison to the rate of revolution of the vehicle tires.

A practical limit for revolution of the torque motors is reached in some embodiments where the motors are of limited size since the high rates of revolution cause the hydraulic fluid to heat to a dangerous level. For example, a fifteen inch wheel at 60 miles per hour is revolving at about 7500 rpm which is too fast for most conventional torque motors in that the oil would become very hot. Use of a two-speed axle or equivalent device reduces the rate of revolution to a safe level. An electrically or hydraulically controlled torque converter may also be used between the torque motors and the differential device of the invention to accomplish the same result. In many cases, the torque motor turns at about five times the rate of the driven wheel when the vehicle is in the low control range of the present invention. Thus, use of one of the conventional two-speed axles, torque converters, or both, is desirable with the present invention but is not explained further since such devices are known in the art.

It should be noted that the front wheels 28 and rear wheels 30 of the vehicle are shown to be driven via the transmission device 14 of the present invention. However, it is possible in some embodiments of the invention to fluidly connect only the front torque motors 26 of front wheels 28 or alternatively, the rear wheels 30 for a two-wheel drive vehicle. Of course, lock-out or shut-off valve devices could also be placed in any of the lines for a vehicle where both four-wheel drive and two-wheel drive are used interchangeably. When this is the case, provision must be made for allowing the hydraulic fluid in the lines to the free-wheeling pair of wheels, either front or rear, to have fluid flowing freely therethrough. Alternatively, the fluid to the rear torque motors 26, for example, could be cut off completely where the torque motors can be disconnected from the driven wheels such that they do not rotate to pump fluid thereby providing some braking action which would resist force provided by the torque motors driving the front wheels, for example.

A transmission range selector device 34 is schematically shown to have a neutral and reverse position in a conventional manner. The device is also shown to have low, second, and drive torque control ranges which are substantially equivalent to the low, second, and drive selections of conventional automatic transmissions.

It should also be understood that the transmission range selector of the present invention receives input information from a speedometer device associated with the wheels of the vehicle. Input from the throttle or accelerator pedal of the vehicle is associated with the transmission device 14 and, when depressed, admits fluid under pressure from pump 20 into the transmission device and to the appropriate torque motors 26.

It should also be understood that fluid from the torque motors 26 returns through fluid return lines shown in FIG. 1, at a pressure somewhat lower than that delivered to the torque motors 26.

The drop in fluid pressure in the torque motors 26 and the interrelationship of the accelerator and speedometer of the vehicle with the transmission device and differential of the present invention will be explained in greater detail below. The differential device 22 comprises two major portions: a differential device to allow for faster rotation of one of a pair of wheels than the other of said pair of wheels during turns; and a positive traction or safety gripping device to compensate for that situation where one of a pair of driven wheels is spinning. Each of the major elements of the present invention will be discussed separately in detail below with reference to the additional drawings of the present invention. Their interrelationship with each other will then be described in a discussion of the operation of the present invention.

Figure 7:
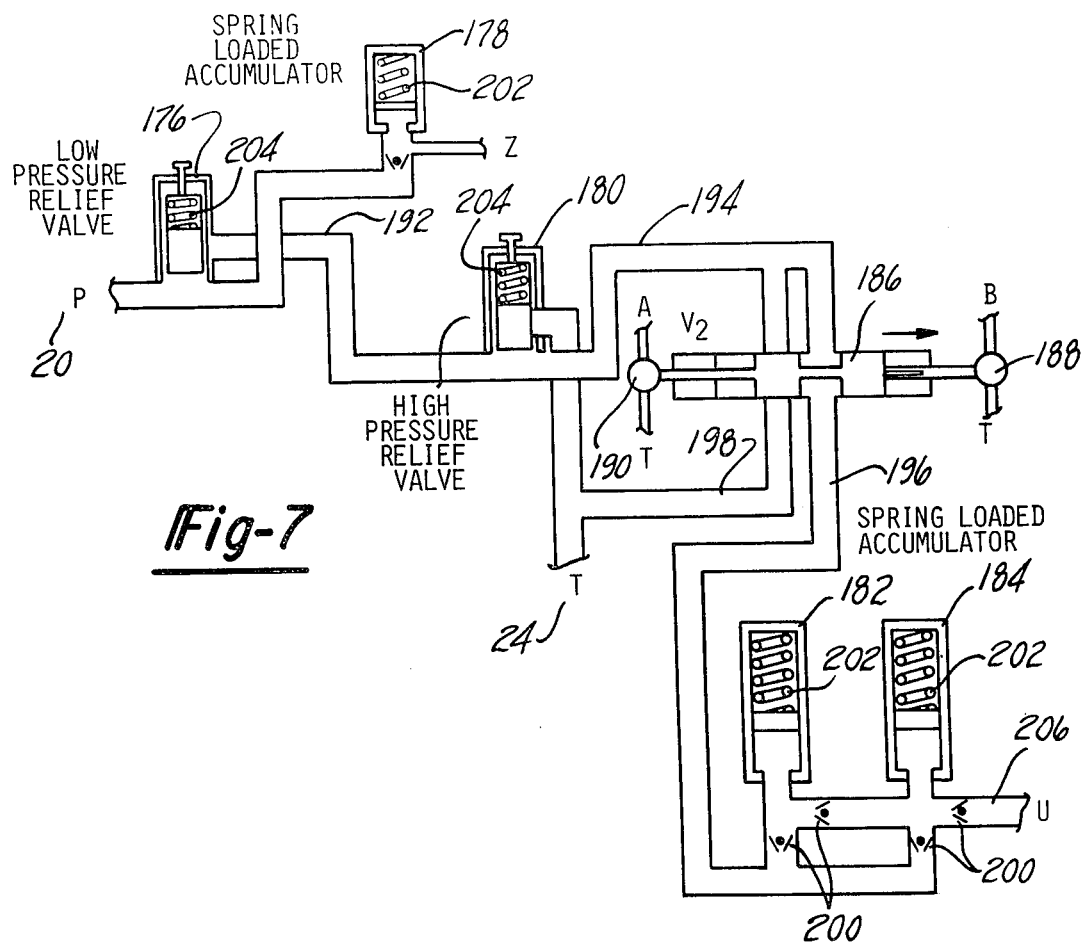
FIG. 7 is a schematic representation of the hydraulic pump, accumulator controls, and relief valves which supply input to the transmission device of the present invention.

An accumulator system is depicted in FIG. 7 to provide a steady flow of pressurized fluid to the transmission device.

FIG. 2A shows a push button selector device of the present invention including pilot line circuitry with appropriate check valves inserted as shown in the pressure line. The push button selector device of the present invention consists of a series of five spool valves channelled in a casing wherein the fluid pressure line from the pilot supply system shown in FIG. 7 and indicated as Z flows through the casings as indicated in FIG. 2A. Each of the casings contains an appropriate cam device connected to the other cams on a shaft, for example, to assure that only one selector button may be depressed at any given time. Such cam devices are known in the art and are presently used with electrical and other push button devices.

The neutral button is shown as depressed in FIG. 2A, and the flow paths through the casings of the reverse, drive, second, and low ranges are accordingly blocked as shown. Of course, fluid under pressure from source Z flows through the neutral casing as indicated to communicate with point B so as to position valve 186 as shown in FIG. 7. Because of the location of the check valves in the fluid circuitry of the selector system and the closed position of the reverse, low, second, and drive control range push buttons, no fluid under pressure is admitted to valves 36 and 38. Thus, the lines fluidly communicating with valves 36 and 38 are at low pressure.

Figure 2B:
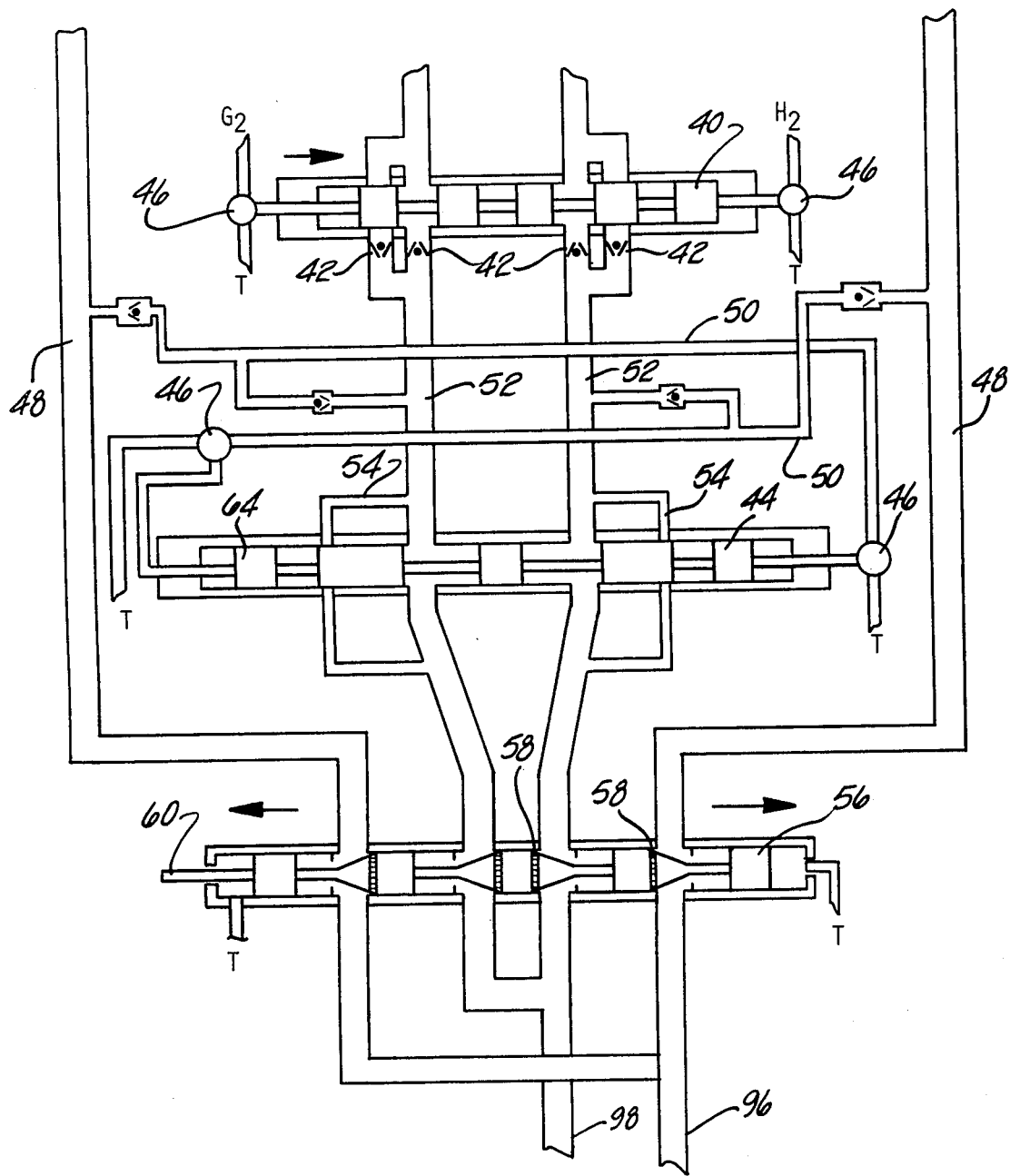
FIG. 2B shows the positive traction and differential circuitry of the present invention in a neutral position, without arrows, indicating no fluid flow.

FIG. 2B depicts the preferred embodiment of the differential and positive traction devices of the present invention with no pressurized fluid flow being shown through the larger transmission line or through the smaller pilot lines since the vehicle is represented to be in the neutral position. The positive traction device and differential device of the present invention will be described in greater detail below in conjunction with the operation of the vehicle in a driven mode.

For purposes of clarity and further explanation of the invention, the fluid pilot lines and fluid pressure lines to the positive traction device, differential device, and torque motors of the invention are labelled by letters indicated in FIG. 2B and the subsequent drawing figures corresponding to various operational modes of a vehicle using the system.

Valve 40 is a forward and reverse valve used to change the direction of fluid in accordance with the supply from the transmission device 14 in a manner to be described below. Valve 40 is controlled by pilot lines connected to the push button selector system shown in FIG. 2A at pressure points G2 and H2. Interposed between pressure point G2 and the forward/reverse valve 40 is a novel valve 46 of the invention which dumps hydraulic fluid through the pilot line to the reservoir tank 24 indicated by the letter T. Similarly, a pressure valve 46 is interposed between pressure point H2 and the forward/reverse valve 40 in FIG. 2B.

Also shown in the main pressure lines associated with valve 40 are check valves 42 positioned as indicated to assure proper fluid flow when fluid is received under pressure from the transmission device 14 or under reduced pressure from the torque motors (not shown in FIG. 2B). Although only two main pressure lines are shown leading to and returning from the torque motors, it is easily appreciated that the lines may lead to torque motors where the vehicle is of a four-wheel drive construction. Alternatively, separate differential and positive traction devices could be provided for the pair of front wheels 28 and the pair of rear wheels 30.

Also shown in FIG. 2B is the positive traction spool valve 44 associated with pilot lines 50 tapped into the main pressure lines leading to the torque motors. Again, valves 46 are associated with the spool valve 44 shown in FIG. 2B in the same manner as forward/reverse spool valve 40 except that the pressurized pilot fluid is supplied from the main lines 48 which lead to the torque motor in a forward mode of the vehicle. Alternatively, the pilot pressure lines 50 receive fluid pressure from the return flow lines 52 which also function as pressure supply lines in the reverse mode of operation. Again, the valves 46 dump excess pressurized pilot fluid to the reservoir indicated by T.

Associated with positive traction valve 44 are bypass pilot lines 54. These bypass lines 54 assure that a minimum amount of flow passes through positive traction spool valve 44 regardless of the position of the valve 44. Alternatively, the spool valve could be provided with small flow passages such as passages 58 shown in spool valve 56 of the differential device of the present invention.

The spool valve 56 has an end 60 shown on the left side in FIG. 2B. This connecting end 60 is operatively connected to and controlled by the steering system in any of various conventional manners to move the spool valve from left to right or back again to the left as shown in FIG. 2B. Fluid from leakage around the seals on the end spools of the differential device drains back to the reservoir T as indicated.

Of course, the positions of the forward/reverse valve 40, positive traction valve 44, and differential valve 56 of the invention are shown in their centrally aligned positions in FIG. 2B to represent the neutral position of the transmission as selected in the selector system shown in FIG. 2A.

Figure 3A:
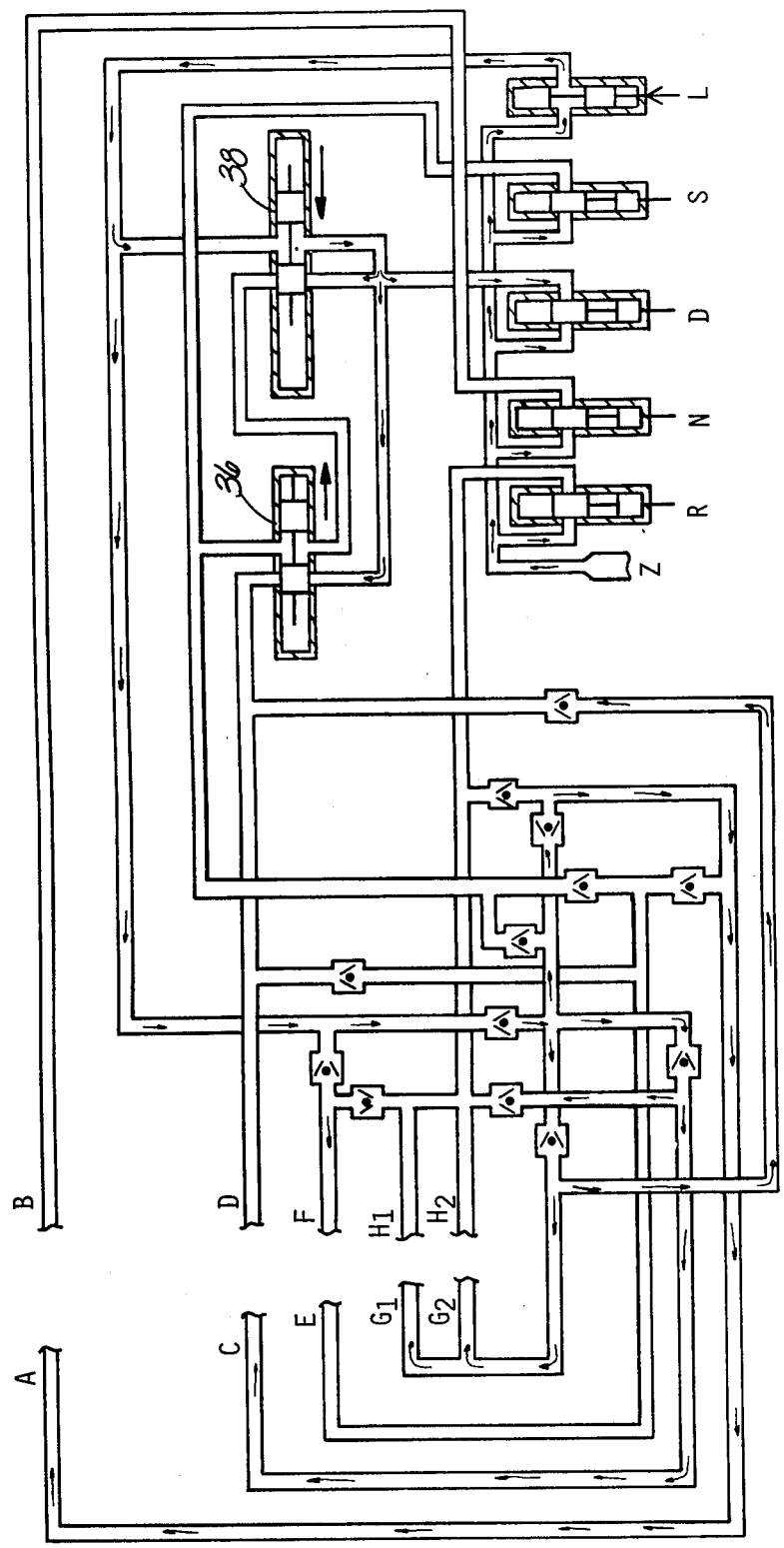
FIG. 3A shows the shifter circuitry in the low position.

FIG. 3A shows the push button selector system of the present invention with the low button selected such that fluid pressure passes through a casing for the low button. Note that fluid pressure is available to both sides of the drive selector button but that fluid does not pass through the drive casing since the drive button cannot be depressed simultaneously with the low button.

Valves 36 and 38 are controlled by appropriate solenoids positioned one at each end of each valve 36 and 38. When the solenoids are located in this manner, one of the solenoids at the end of valve 36 and one of the solenoids at the end of valve 38 is always energized. Although this can prevent some minor difficulties in certain environments, it does provide faster shifting of the valves 36 and 38 between the left-hand and right-hand positions. The solenoids are not shown in the drawings since they are of conventional design but merely apply to activate the novel valves and pilot pressure lines of the invention.

Figure 3B:
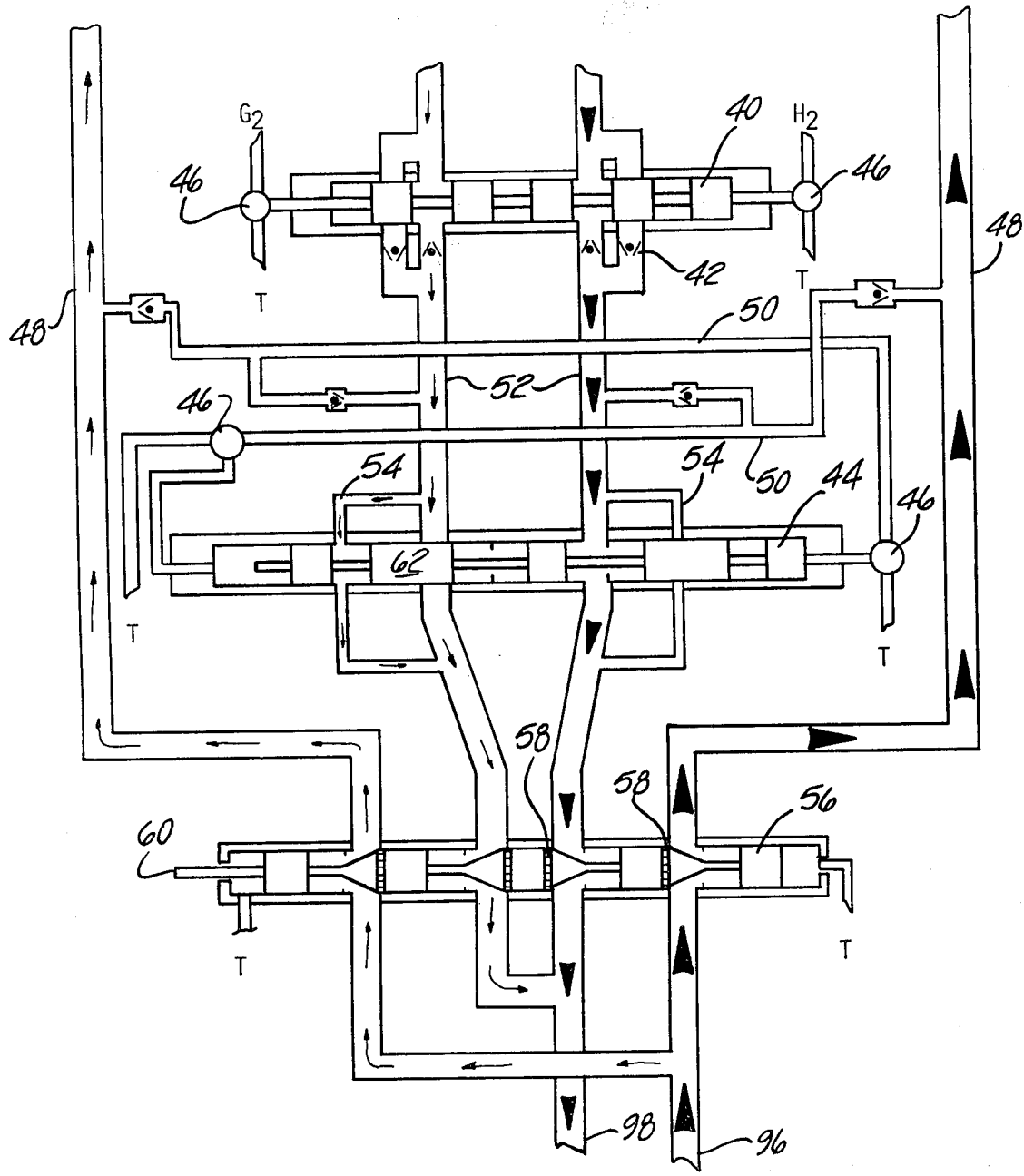
FIG. 3B shows the positive traction and differential hydraulic circuits and control spool valves according to the present invention with the positive traction control spool valves shifted to the right to compensate for spinning of the left wheel.

The flow of pressurized fluid is indicated by the arrows shown in the pilot lines of FIG. 3A. As can be seen, the flow is directed in the pilot lines and controlled by the various appropriately located check valves to direct fluid to pressure points A (see FIG. 7), C, G1 (FIGS. 3C and 3D), and G2 (FIG. 3B). The operation of the fluid pilot lines to pressure points C and G1 will be explained in more detail below.

Referring now to FIG. 3B, the connection of the selector system pressure line to pressure point G2 is shown above valve 46 in FIG. 3B. Thus, it is readily appreciated that valve 40 is slid to its right-hand position to allow flow in line 52 from top to bottom as viewed in FIG. 3B; i.e., return flow from the torque motors.

The large arrows in pressure line 48 to the right-hand torque motor as viewed in FIG. 3B represent high pressure fluid from the transmission system 14 of the present invention to the differential spool valve 56. The intermediate size arrows in the right-hand return flow line 52 represent the fluid flowing from the torque motors at a reduced pressure.

Positive traction spool valve 44 is shown shifted to the right as viewed in FIG. 3B. When the valve 44 is in this position, most of the flow from left-hand return flow line 52 is blocked by the enlarged spool 62 with only a minimal flow passing through bypass line 54 associated with the left-hand return flow line 52. Thus, the small arrows in the lower portion of left-hand return flow line 52 which have passed through bypass line 54 represent a greatly reduced pressure in the fluid returning to the transmission device 14 since the left-hand torque motor is prevented from turning at a rapid rate due to the decreased flow rate of fluid by means of the blockage of spool 62 in line 52. The net result of the blockage of spool 62 is that a greater volume of pressurized fluid is delivered to the right wheel which was not spinning. In this manner, an automobile may be extricated from a slippery spot where one wheel is spinning on ice or in sand, mud, or the like. Such would be the status of the left wheel for the device shown in FIG. 3B.

The spool valve 56 is shown in the central position in FIG. 3B indicating that the steering mechanism of the vehicle has appropriately positioned valve 56 by connection at end 60 of the valve 56. Of course, it is realized that the valve 56 is movable to a great number of positions between extreme left and extreme right-hand position of valve 56 representing a hard left turn and a hard right turn, respectively.

The transmission device 14 is represented as fluid circuitry, control valves, and spool valves in the same manner as indicated for the differential device and positive traction device of the present invention shown in the previously discussed drawing figures.

The pump 20 and accumulators 202 shown in FIG. 7 supply fluid under pressure to line 64 (FIG. 3) which supplies fluid under pressure to the transmission device 14 through spool valve 66 in the circuitry shown. Spool valve 66 is connected by appropriate means to throttle linkage at the end 68 of spool valve 66. It should be noted that line 64 supplies fluid under pressure not only to the main supply line beginning at 70 but also to the pilot pressure lines 72 and 74. Spool valve 66 is biased toward the end 68 by spring 76 shown in the casing 78 for spool valve 66. The return flow of fluid from the torque motor is controlled by spool valve 66 to line 80 which also receives return pilot fluid through line 82. All of the return pilot lines from the various spool valves of the transmission 14 and positive traction device return through the construction of a novel valve of the invention represented as valve 46 in the drawing FIGS. 2B and 3B. It should be understood that the same novel valve construction is represented by the circles in the pilot pressure lines of FIG. 3C and subsequent drawings having these circles, although the individual circles are referred to by separate reference characters hereinafter.

Figure 3C:
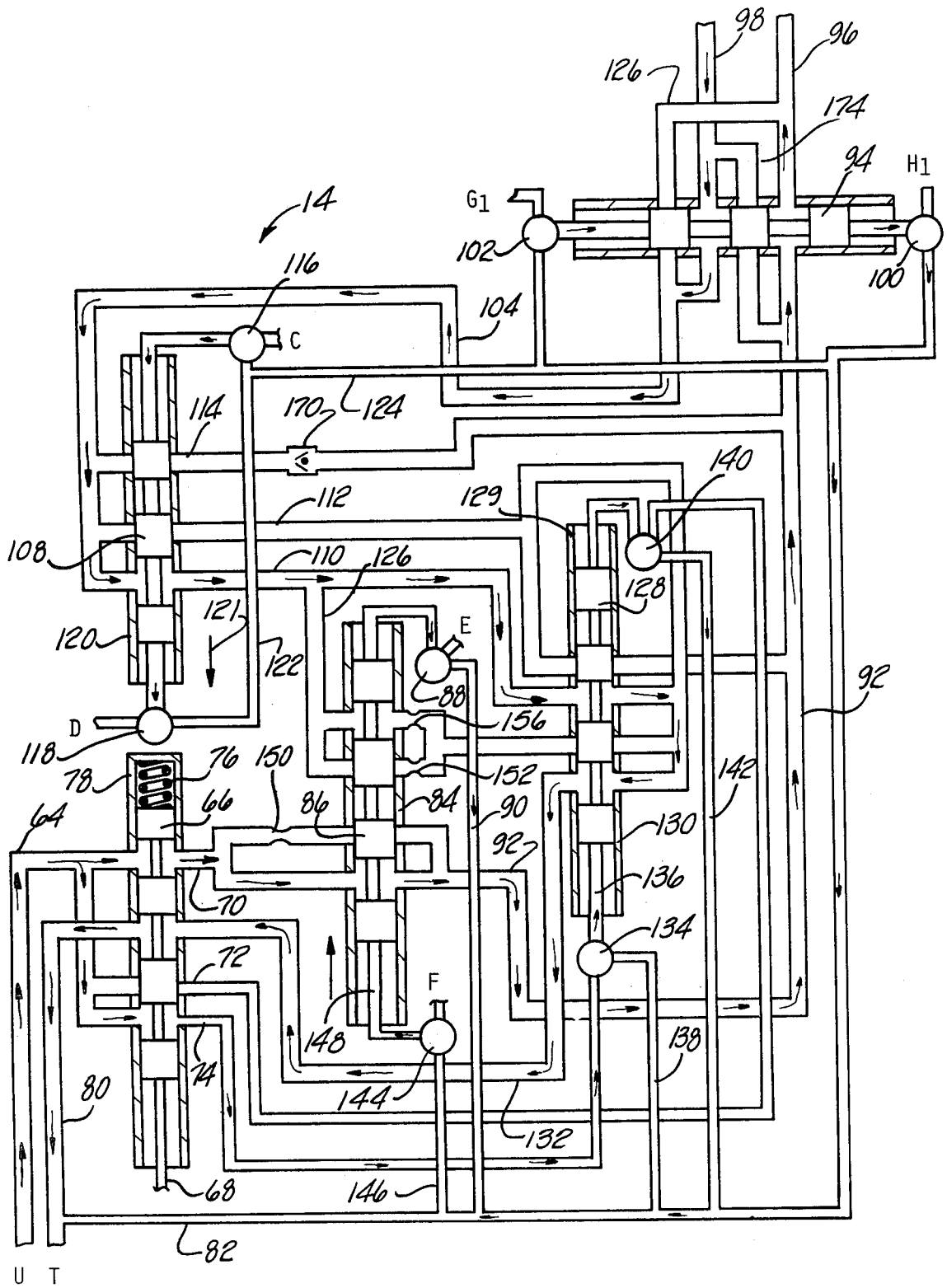
FIG. 3C shows the range control transmission device according to the present invention for varying the torque output to the drive motors with the control spool valves in the corresponding positions for low control range with the accelerator depressed.

Still referring to FIG. 3C, the transmission device 14 is shown in the low position with fluid pressure flowing through spool valve 66 and through casing 84 containing spool valve 86. Spool valve 86 has been shifted to an upper position as viewed in FIG. 3C due to the pilot pressure received at pressure point F as indicated in the pressure flow shown by the arrows of FIG. 3A. Of course, the corresponding pressure point E does not receive pressurized fluid from the transmission selector device, and, according to the construction and proper operation of valve 88, excess fluid is diverted through line 90 to line 82 and returned to reservoir 24 by line 80 as indicated. Thus, the fluid from input line 70 is directed through the casing 84 and through spool valve 86 to line 92 as indicated by the arrows representing fluid flow.

The fluid under pressure is then directed via line 92 through spool valve 94 which is shown in a position shifted to the right in FIG. 3C to indicate the normal or forward mode of operation of the vehicle using the transmission device 14. As can readily be seen, if a pilot pressure is supplied to pressure point H1 rather than pressure point G1 as indicated in drawing FIG. 3A, the spool valve 94 would be shifted to the left position thereby reversing the direction of flow that is shown in lines 96 and 98. This is, of course, accomplished by blocking the appropriate supply lines with the portions of the spool valve indicated by the square symbols formed as part of valve 94. Valves 100 and 102 are the novel valve design according to the present invention which will be discussed in more detail below.

Fluid returns from the torque motors, differential device, and positive traction device shown in FIG. 3B by way of valve 94 and into return flow line 104 as indicated by the arrows to spool valve 108.

In the same manner as indicated for the spool valve 86 of the transmission device as discussed above, fluid flows through valve 108 under a somewhat reduced pressure from the torque motors and into line 110. Line 110 is open and lines 112 and 114 are closed because spool valve 108 has been shifted to a lower position as viewed in FIG. 3C. The valve 108 was shifted to the lower position by incoming pilot pressure at pressure point C which corresponds to pressure point C indicated in drawing FIG. 3A. Accordingly, when valve 116 has pressure from pressure point C, valve 118 has received a slight amount of pressure from the casing 120 of valve 108 and the novel valve 118 functions to return a small portion of fluid to valve 118 and out through line 122 thereafter connecting to line 124, to return line 82, and eventually to the reservoir 24 represented by the T in FIG. 3C.

Pressurized fluid then passes from valve 108 through line 110 and bypasses line 126 and valve 86 for reasons to be discussed below. The fluid proceeds through line 110 and to spool valve 128. The fluid flows through spool valve 128 twice because of the position and structure of the spool valve in its casing 130. Thereafter, the fluid under pressure flows through line 132, back through valve 66, and returns to reservoir 24 indicated as T.

Valve 128 is also referred to as the "kick-down" valve since it actuates with the throttle valve 66.

Valve 134 receives pressure from pilot line 74 transmitting the pressure to the end 136 of spool valve 128. Accordingly, line 138 is closed off by valve 134. Thus, line 138 has a low pressure fluid therein.

When pilot fluid pressure activates valve 128 to its upper position as viewed in FIG. 3C, fluid pressure is transferred to valve 140 and back to the reservoir 24 through line 142, 82, and 80 as indicated. Of course, supply line 72 is not supplied with fluid under pressure since it is blocked by spool valve 66 and closed at valve 140.

Still referring to FIG. 3C, spool valve 86 is in its upper position as viewed in FIG. 3C, since it is receiving fluid pressure to the pilot line from the shift system to pressure point F at valve 144. Accordingly, line 146 is closed off and fluid pressure is communicated to the end 148 of valve 86. Since a small portion of fluid is forced from the upper end of the casing containing valve 86, fluid pressure is communicated to valve 88 to return line 90. In accordance with the fluid diagram of the shifter system shown in FIG. 3A, pressure point E is closed off by valve 88 allowing the return of fluid to the reservoir 24 through lines 90, 82, and 80 by means provided in novel valve 88 which has the same structure as valve 208 shown in FIG. 8.

I have provided orifices 150, 152, and 156 in the pressure lines associated with valve 86. Notably, none of the orifices restrict or otherwise affect the fluid flow when the spool valves of the transmission device 14 are in the position shown in FIG. 3C. However, their function becomes very important in restricting the flow of fluid when the shifter system is in another position to vary the position of valve 86 and the other spool valves of the transmission device and the valves 94 and 40 controlling the direction of fluid flow through the torque motors.

The orifices are also performing an important function when the vehicle accelerator is released in low or second control range. As shown in the embodiment of low control range represented by the position of the spool valves of the transmission device shown in FIG. 3C, the maximum flow of fluid under pressure is permitted from spool valve 66 through to the torque motors of a vehicle using the transmission of the invention.

Reference is now made to FIG. 3D which again represents the transmission device 14 in the low control range as indicated by the selector system of FIG. 3A. However, in FIG. 3D, throttle valve 66 and kick-down valve 128 are shifted from an upper position to a lower position as viewed in FIG. 3D. Note that spring 76 is now extended since the accelerator has not been depressed to actuate the throttle linkage connected to the end 68 of valve 66. Accordingly, since the position of valve 66 has changed, pilot line 72 receives fluid pressure from line 64 thereby sealing the return line 142 and allowing pressure under fluid to flow into the casing 129 of kick-down valve 128. A small portion of fluid is forced out of the lower cavity 136 of the casing through valve 134, sealing line 74, and expressing fluid through line 138 to lines 82 and 80 back to the reservoir 24.

Figure 3D:
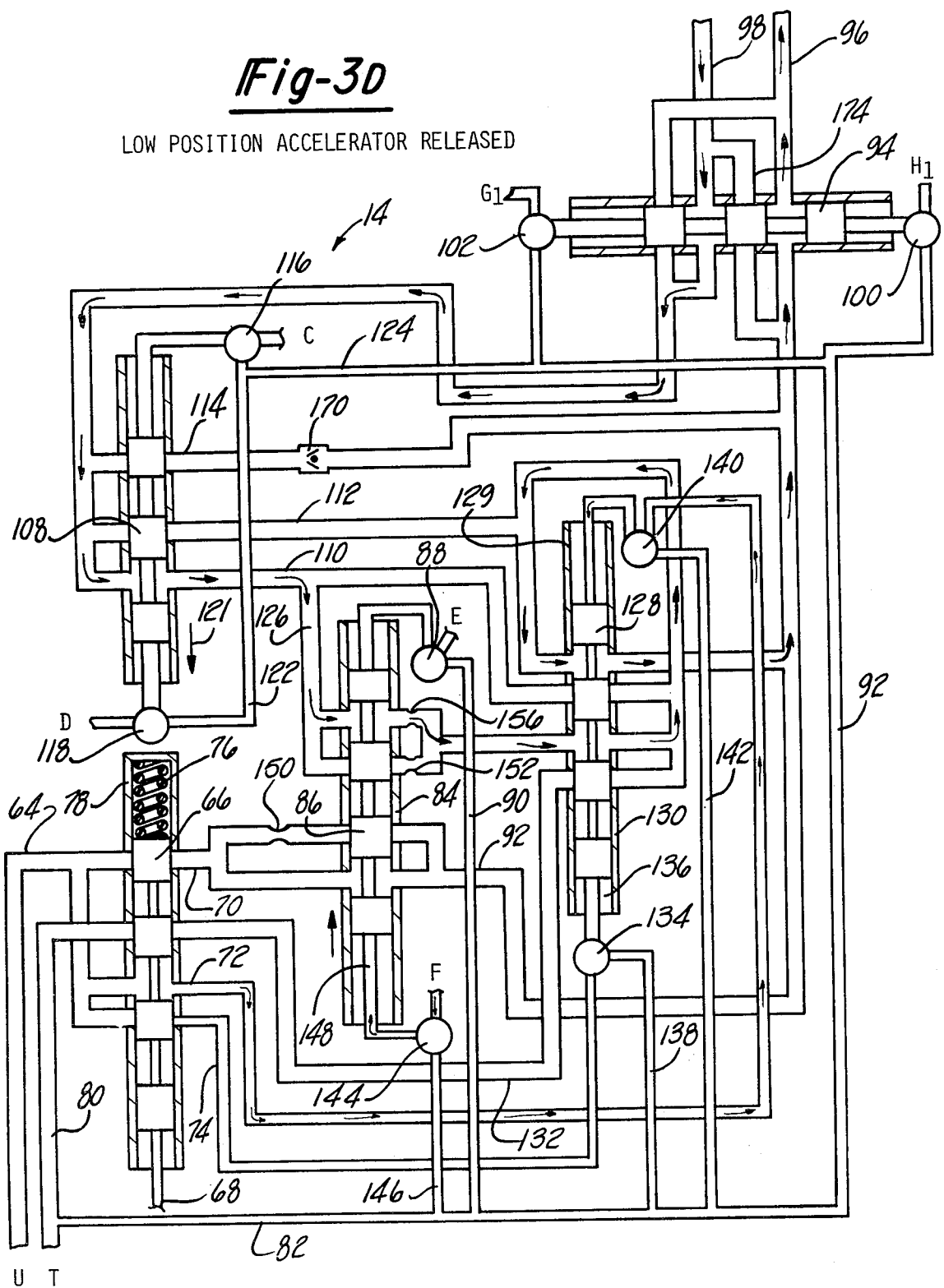
FIG. 3D shows the transmission device according to the present invention in the low control range but with the accelerator released.

The above-described shift of the kick-down valve 128 allows fluid to pass through line 126, to valve 86, past orifice 156 and through the kick-down valve 128 so as to recirculate in the manner indicated by the arrows, passing once again through kick-down valve 128 for return to main supply line 92 and eventually to the torque motors. The arrows shown in FIG. 3D represent a recirculation circuit which supplies fluid to the torque motors.

Since the accelerator of the vehicle is not depressed, but the vehicle has been moving from operation in the low control range, the torque motors act as pumps due to the inertia of the vehicle and the rotation of the tires of the vehicle. Fluid is pumped through the torque motors around the recirculation circuit described above and meets some resistance at orifice 156. Thus, because of orifice 156, the recirculation circuit effects a braking action on the torque motors and consequently also on the vehicle since it is pumping against a pressure head presented by orifice 156.

Accordingly, the device 14 of the present invention is especially valuable for use with turbine engines where braking of the vehicle has represented an extremely difficult task. Accordingly, use of the transmission device with a turbine engine powered vehicle is especially preferred according to the present technology.

Figure 3E:
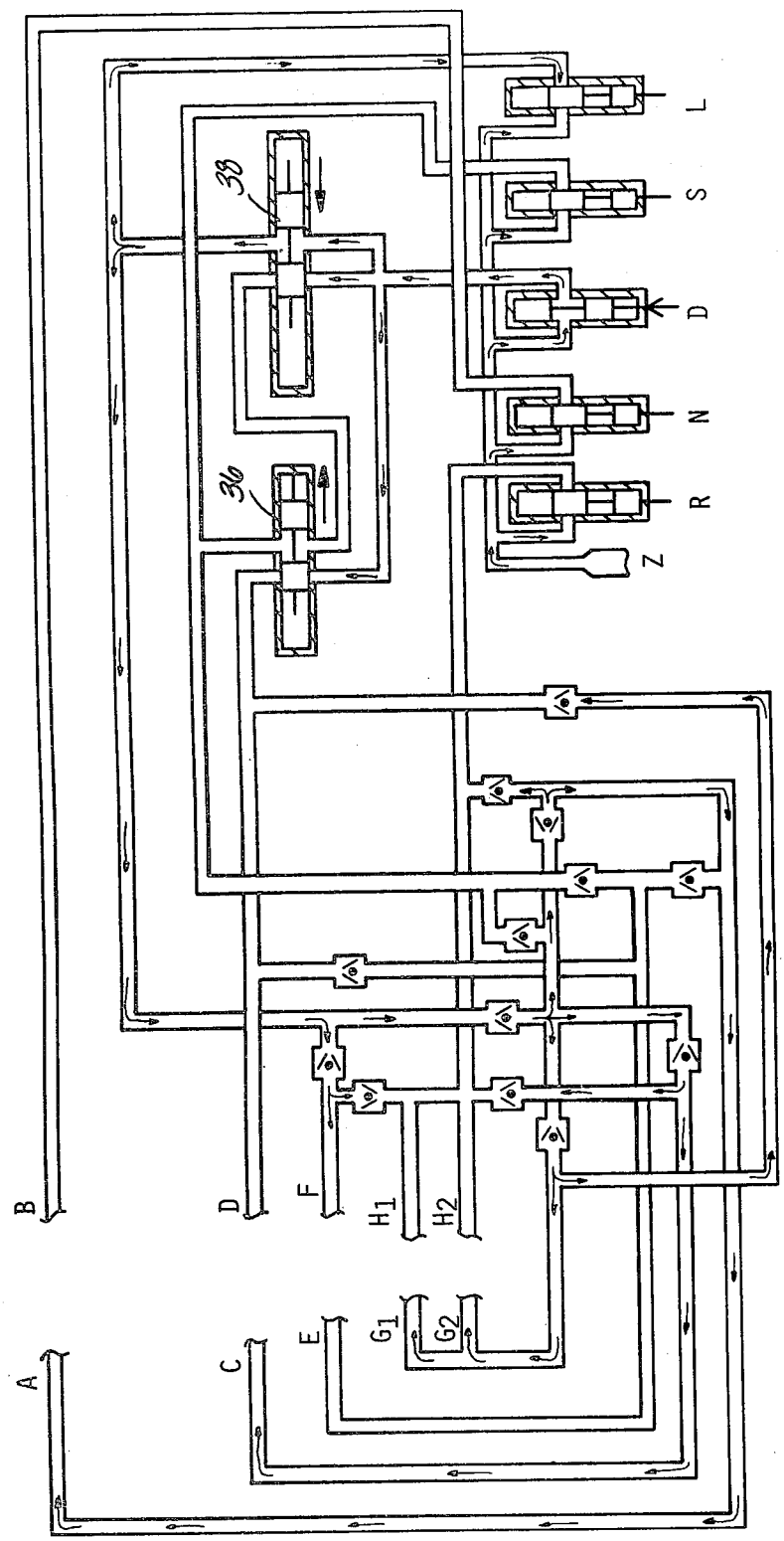
FIG. 3E shows the shifter device of the present invention with the solenoid controlled fluid flow valves shifted to the corresponding positions for the drive low control range of the transmission device.

With reference now to FIG. 3E, the shifter selector system of the invention is shown with the drive push button depressed and with valves 36 and 38 in predetermined positions for the low control range as controlled by the speedometer input to the solenoid valves located at each end of valves 36 and 38. A comparison of FIGS. 3A and 3E discloses that the pressure points A, C, F, G1, and G2 again receive pressure when valves 36 and 38 are positioned as indicated and the drive button is selected rather than the low push button. Of course, the only difference in flow is that the pressurized fluid flows through the casing for the drive push button and is blocked through the casing of the low push button. However, valves 36 and 38 are now subject to being repositioned according to the speed of the vehicle, which repositioning effects pressure to different pressure points than those indicated when the low push button is depressed.

Figure 3F:
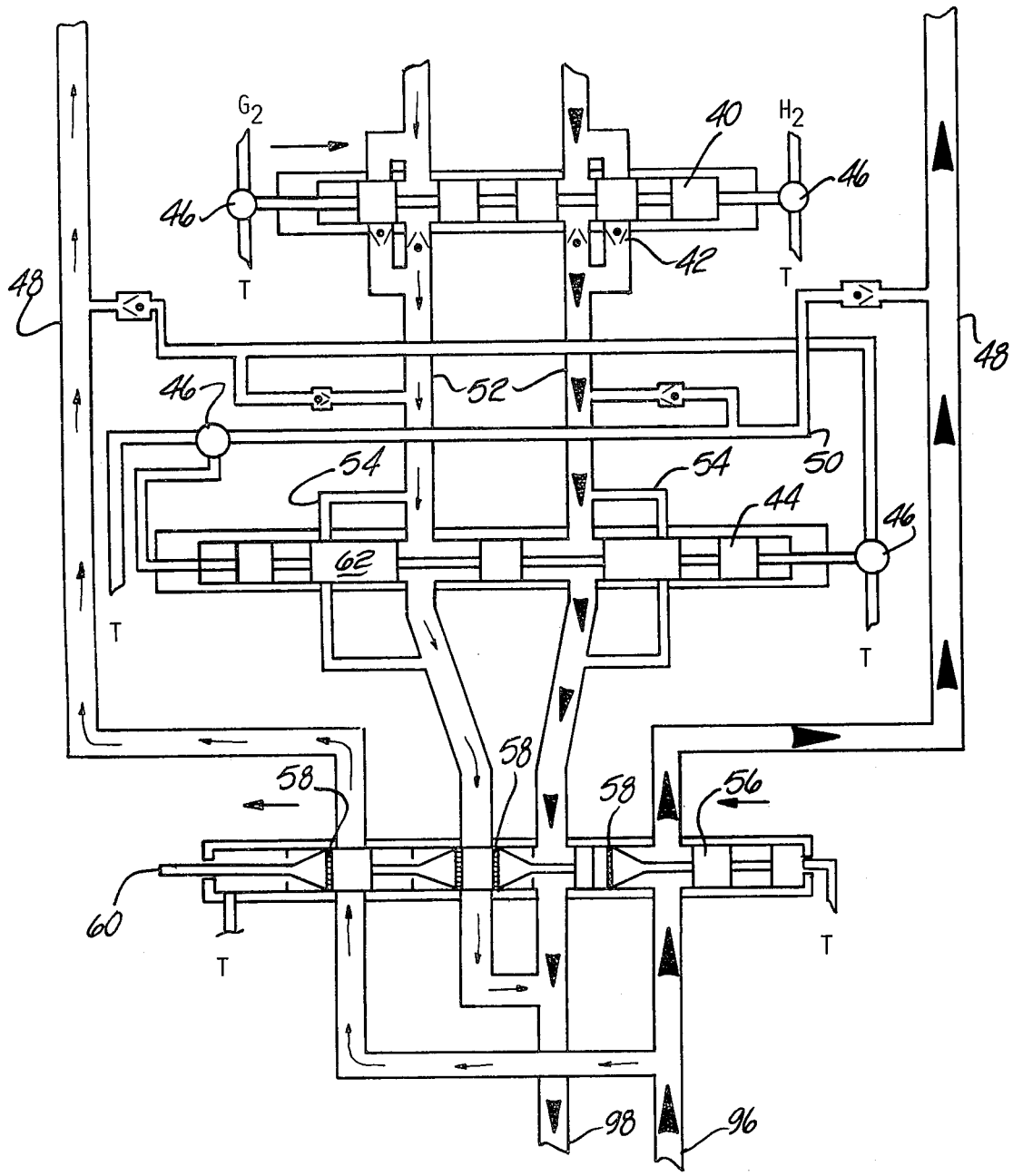
FIG. 3F shows the positive traction and differential device according to the present invention wherein the vehicle is in a left turn.

Referring now to FIG. 3F, the positive traction device and differential device are thereshown in the normal position for forward motion of the vehicle with fluid being received in pressure lines 48 and returned through pressure lines 52. However, unlike the representation in FIG. 3B, FIG. 3F shows the vehicle in a left turn such that valve 56 is shifted to the left by appropriate controls from the steering system which affect the end 60 of valve 56. Accordingly, the central spool of valve 56 blocks the left-hand return flow line 52 thereby decreasing the rate of fluid flow through the left-hand torque motor receiving pressure from line 48 and returning it to the left-hand line 52 as viewed in FIG. 3B. The narrow passages in the spool valve 56 allow a predetermined minimum of fluid flow through valve 56 thus allowing a small rotation of the left-wheel for a corresponding greater rotation of the right wheel when the vehicle is in a hard left turn. Again, the tapered portion of valve 56 is effective for making small incremental changes in the fluid flow through the left-hand torque motor by decreasing the return flow through left-hand line 52 and also decreasing the fluid supply through left-hand fluid line 48 to the torque motor. The smaller arrows in left-hand line 48 and left-hand return line 52 indicate the decreased flow of fluid to the left-hand torque motor as compared to the flow through the right-hand torque motor.

Figure 4A:
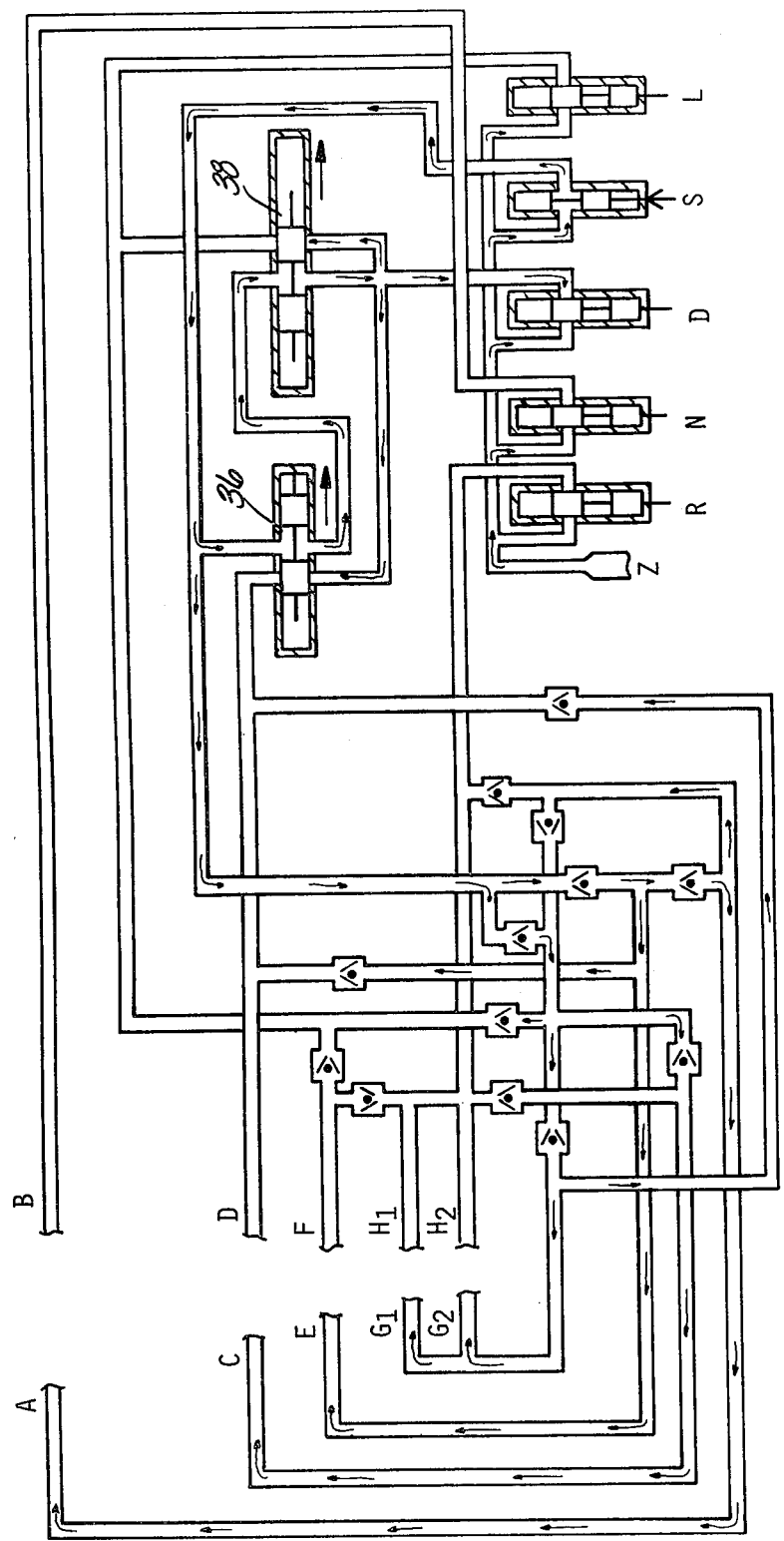
FIG. 4A shows the shifter mechanism according to the present invention in the second control range position.

Referring now to FIG. 4A, the transmission selector system is thereshown with the second control range push button depressed to allow pressurized fluid to flow through valves 36 and 38 and provide pressure to pressure points A, C, E, G1 and G2 as indicated and as shown in the corresponding positions on FIGS. 4A, 4B, 4C, and 4D. Both valves 36 and 38 are now shifted to a right-hand position as viewed in FIG. 4A thus directing the pressurized fluid through the corresponding pressure points.

Figure 4B:
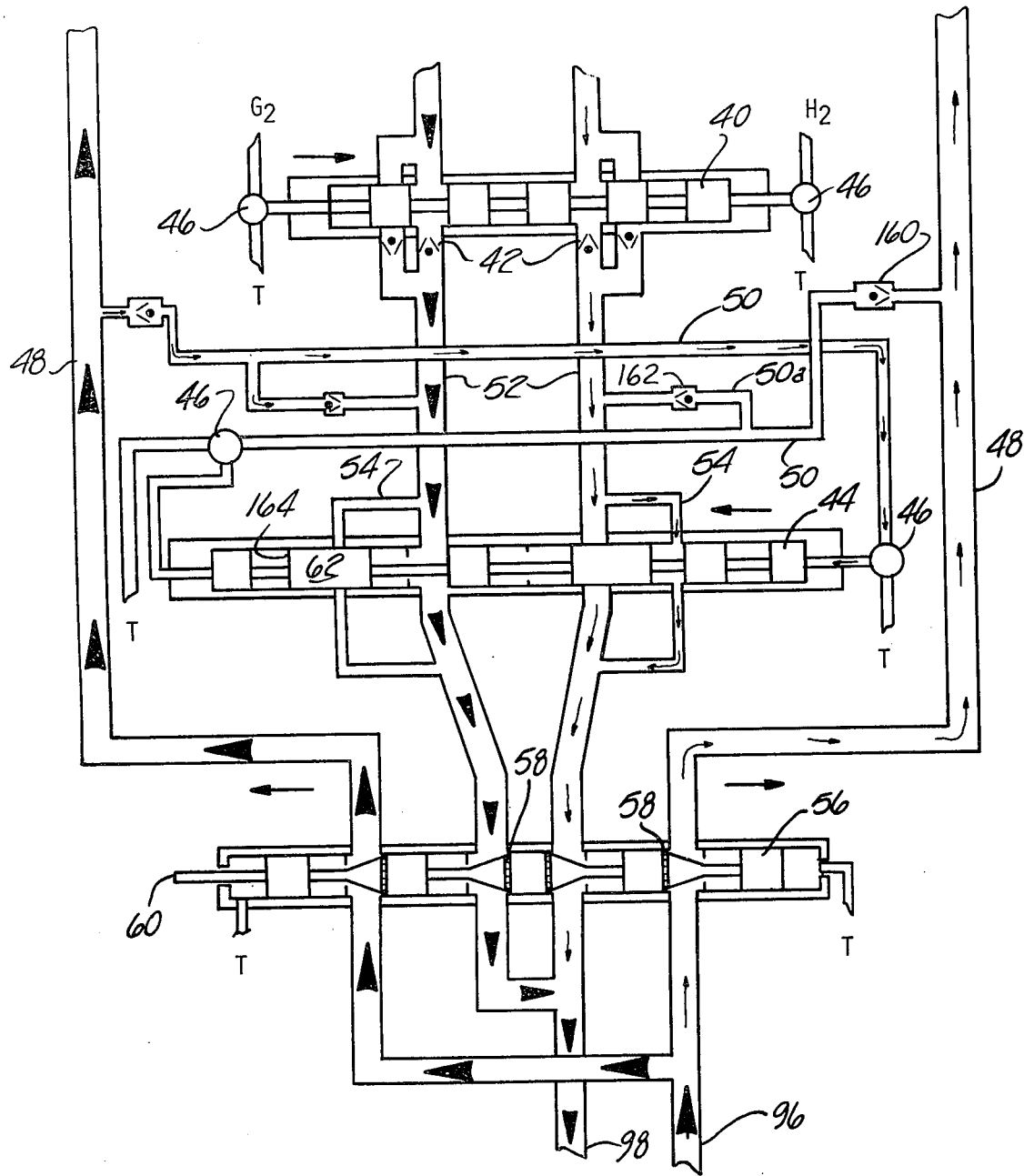
FIG. 4B shows the positive traction and differential device according to the present invention with the positive traction control spool valve shifted to the left to compensate for a spinning right wheel.

FIG. 4B shows the differential device and positive traction device of the present invention in the same manner as shown in FIG. 3B but representing a right wheel spin condition. As indicated by the small arrows on the right-hand portion of FIG. 4B and the larger arrows on the left-hand portion of FIG. 4B, the pressure has dropped somewhat in the right-hand circuit due to the spinning driven wheel. This decreased pressure in the right-hand circuit is automatically "sensed" in pilot pressure line 50 for the right-hand circuit. The pilot pressure line 50 with its subpilot pressure line 50a is operative regardless of the direction of flow through the torque motor; i.e., whether the flow is in the reverse mode or the forward mode of operation of the vehicle.

Check valves 160 and 162 represent conventional check valve designs, for example, the orifice and ball type depicted at 160 and 162. In the forward mode of operation, the pressure through check valve 160 is slightly greater than the pressure presented to check valve 162. Thus, the pressure flow proceeds from right-hand line 48 through check valve 160, and along the remaining portion of the pilot line 50 for the right-hand circuit through the novel valve 46 to the left-hand end 164 of spool valve 44. Of course, in the reverse mode, the pressure presented to check valve 162 will be slightly greater than the pressure presented to check valve 160 and fluid flow proceeds from right-hand line 52, through check valve 162, through subpilot line 50a, through the remaining portion of the right-hand pilot line 50, through valve 46, and to the end 164 of check valve 44.

Figure 4C:
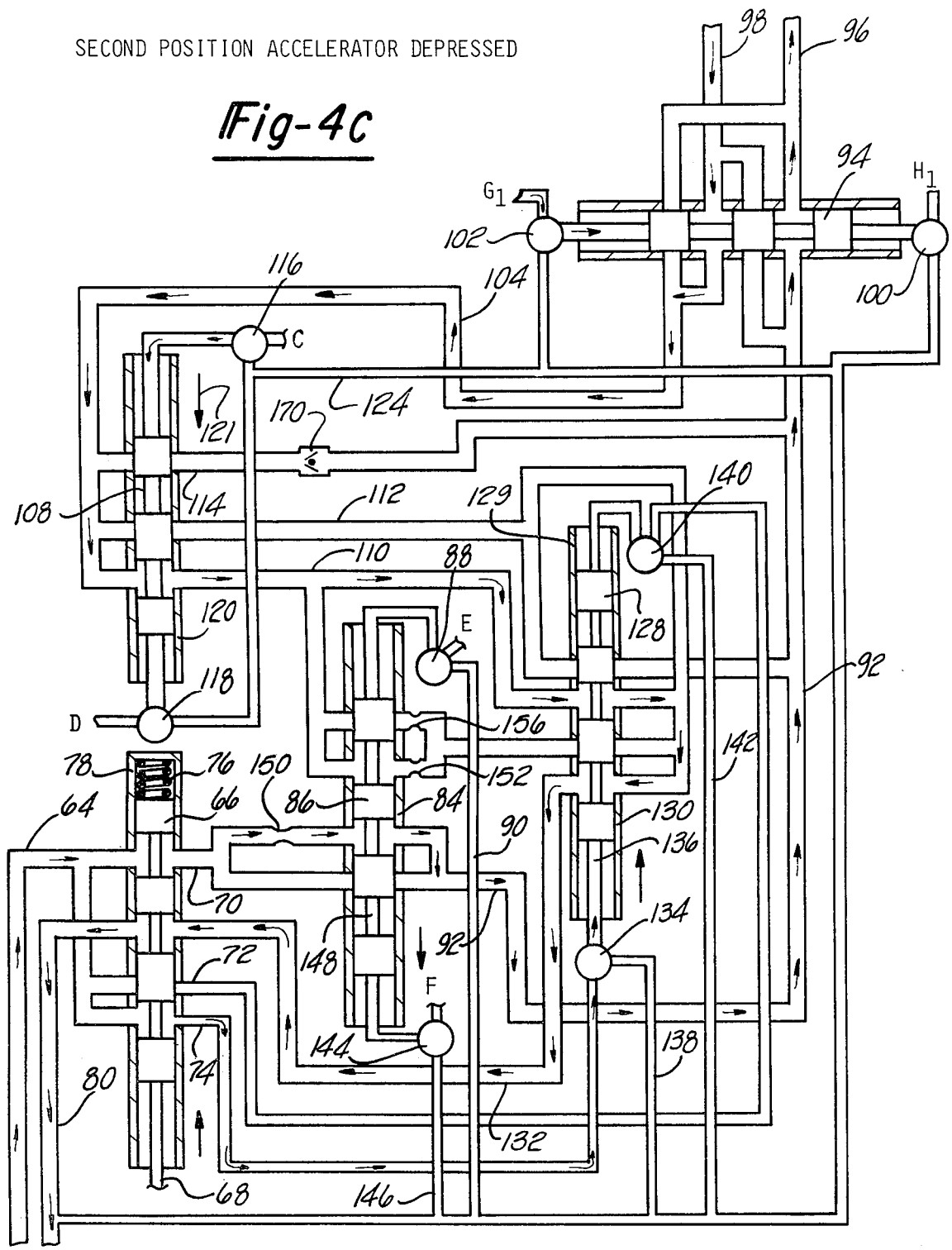
FIG. 4C shows the transmission device according to the present invention with the control spool valves in corresponding positions for the second control range with the accelerator depressed.

FIG. 4C shows the transmission device of the present invention in the second control range position with the accelerator depressed thereby compressing spring 76 and opening pressurized fluid flow from line 64 into main supply line 70. However, at this point, unlike FIG. 3C, fluid flow is directed through that portion of main supply line 70 which contains orifice 150 thereby restricting somewhat the flow of fluid to the remainder of the supply line 92. The fluid is directed through orifice 150 because spool valve 86 is shifted to its lower position as seen in FIG. 4C by the pressure exerted through valve 88 at pressure point E. Note that pressure point E, not pressure point F, is indicated to have fluidized pressure through pilot lines to valve 88 rather than through pilot lines to valve 144 by way of pressure point F (see FIG. 4A).

When pressure applied through point E shifts valve 86 to its lower position, the return flow is also diverted from passing through orifice 156 to a route passing through the somewhat larger orifice 152. Since the diagram represents the position when the accelerator is depressed, the kick-down valve 128 is in the same position as for FIG. 3C (low control range). Other than the passage of fluid through orifice 152 rather than orifice 156, the flow of fluid in the main lines and the pilot lines of the circuitry shown in FIG. 4C is essentially the same as that shown in FIG. 3C.

Figure 4D:
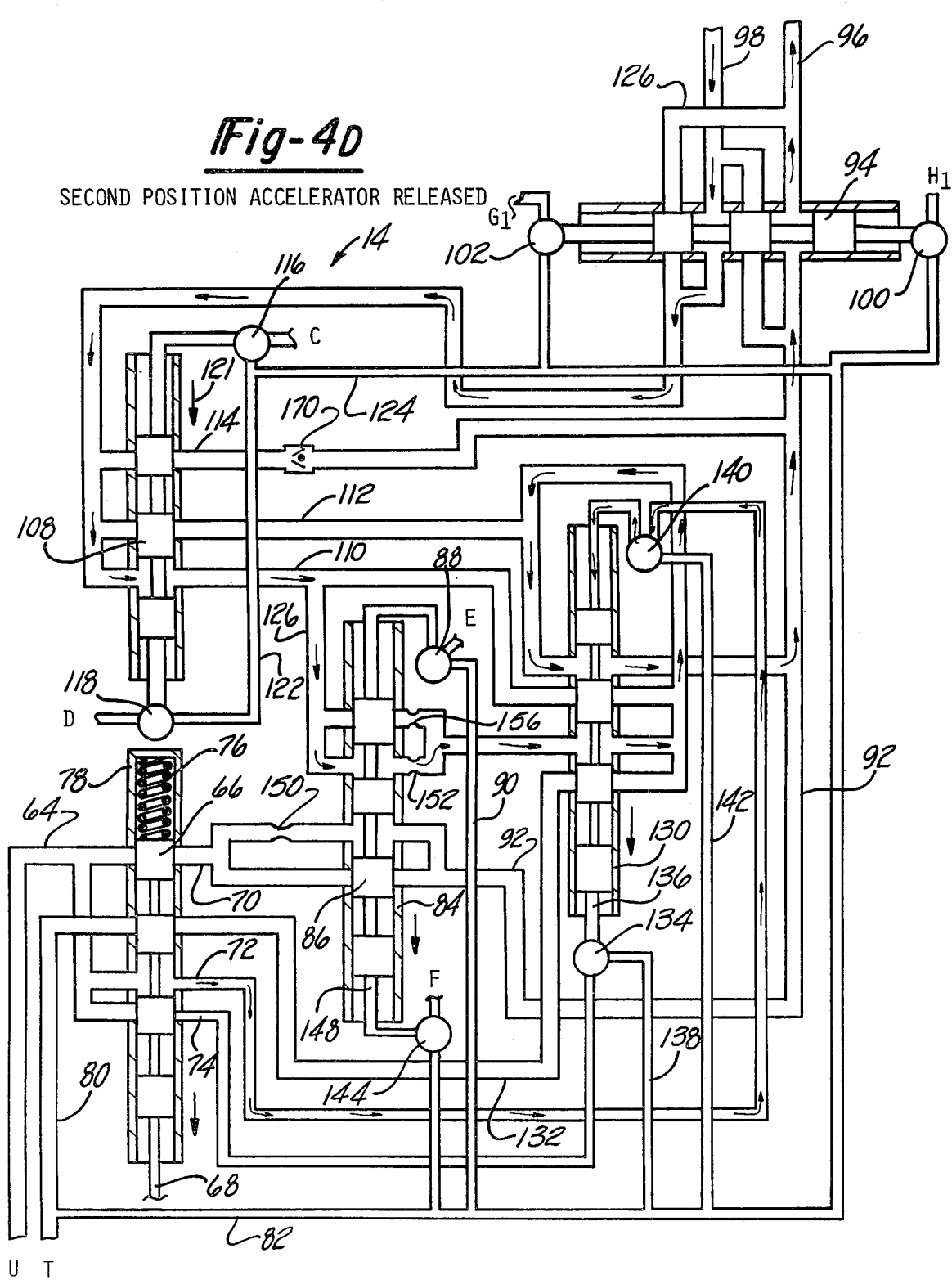
FIG. 4D shows the transmission device according to the present invention in the second control range with the accelerator released.

FIG. 4D represents the transmission device of the present invention in the second position but with the accelerator released thereby allowing spring 76 to expand and close throttle valve 66 as indicated. Since, in this situation, pressure is allowed to flow to pilot line 72, such pressure is presented to novel valve 140 thereby moving the kick-down valve to a lower position so as to set up a recirculating flow as indicated by the arrows in FIG. 4D. As in the low range position represented by FIG. 3C, the torque motors are once again pumping against a pressure head represented by orifice 152. This effects a braking action of the torque motors and consequently also the vehicle by means of the driven wheels.

FIG. 4E shows the transmission shifter selector with the drive push button depressed. The solenoids controlling the position of spool valves 36 and 38 receive appropriate input from the speedometer device of the vehicle such that both valves are shifted to the right-hand position as viewed in FIG. 4E. Thus, fluidized pressure is presented through the pilot lines to the appropriate pressure points A, C, E, G1, and G2 as indicated in FIG. 4A.

Figure 4F:
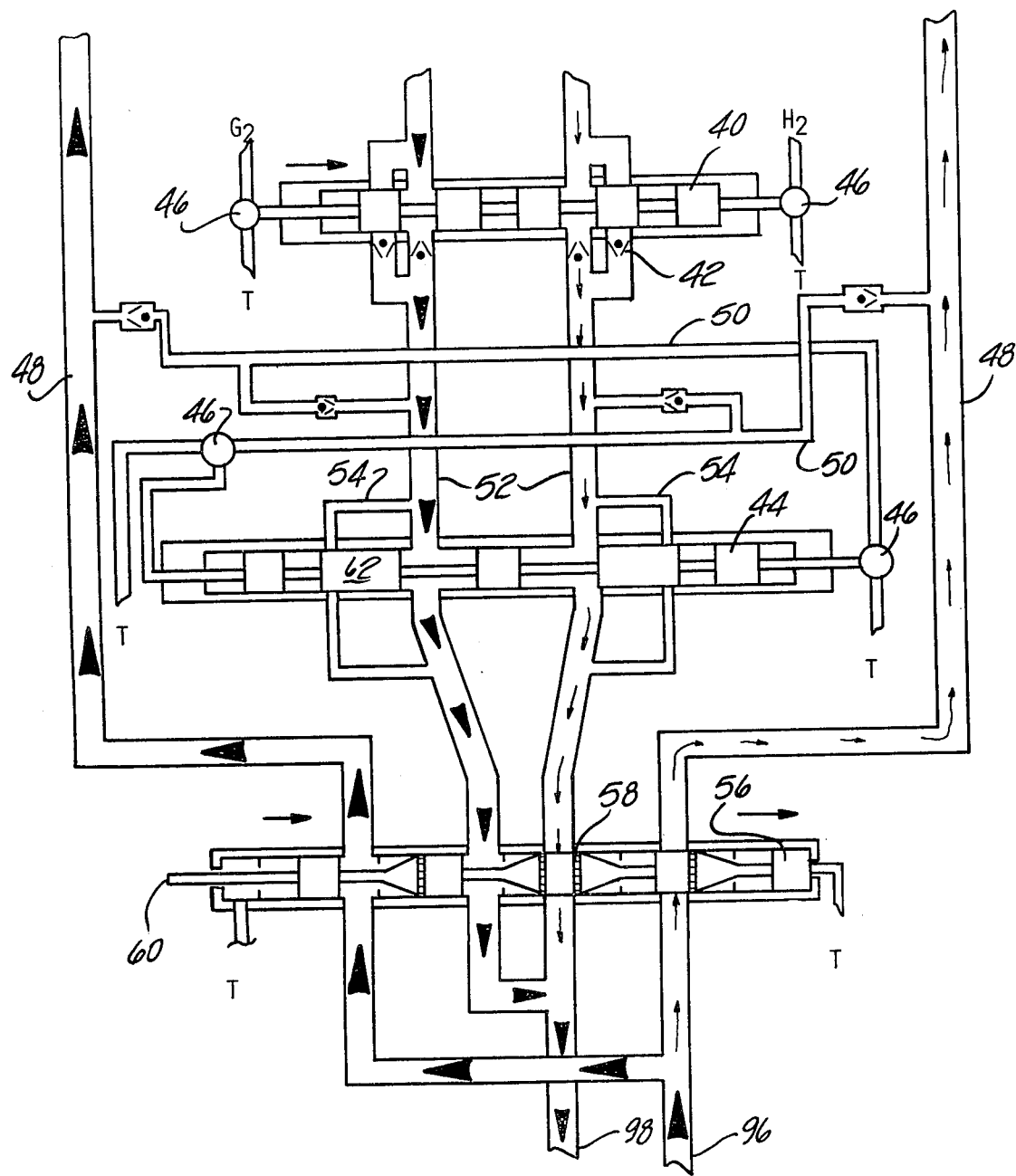
FIG. 4F shows the differential and positive traction devices of the present invention with the differential control spool valve shifted to the extreme right for a right turn of the vehicle.

FIG. 4F represents the positive traction device and differential device of the present invention with the vehicle in a forward mode of operation but representing an extreme right turn since spool valve 56 has been shifted to a right-hand position as viewed in FIG. 4F due to a control on the steering system. As can be seen, only a small portion of fluid flows through the perforated portion 58 of the spool valve where it is aligned in flow line 48 on the right-hand side of FIG. 4F. Similarly, only a small portion of fluid returns to the right-hand return line 52. Thus, the left torque motor is allowed to rotate at a more rapid rate than the right torque motor thereby allowing for a hard right turn.

Figure 5A:
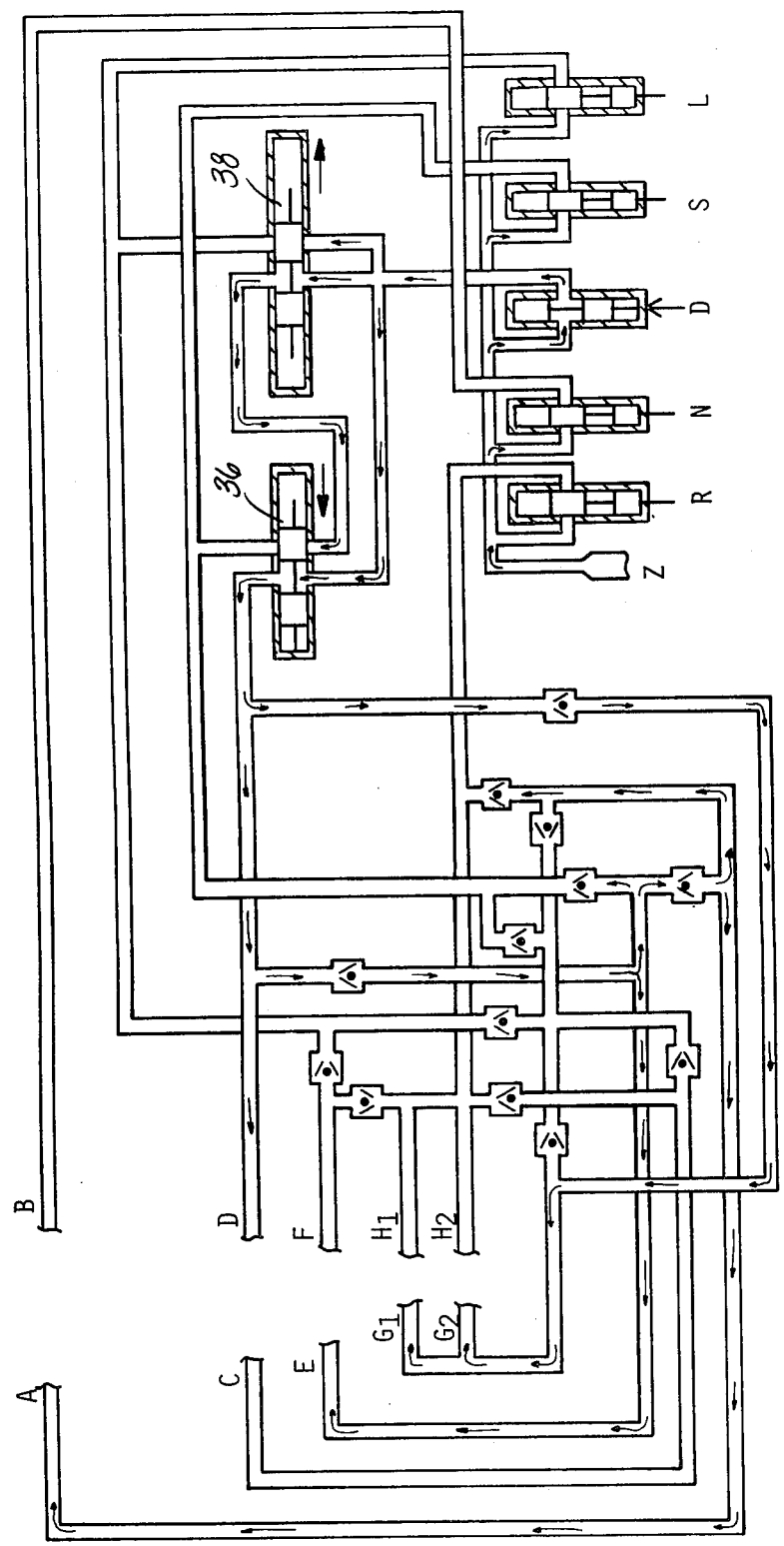
FIG. 5A shows the shifter mechanism in the drive mode with the valves in corresponding positions for the high control range.

FIG. 5A shows the transmission shifter selector of the present invention with the drive push button depressed. Valve 36 is indicated as shifted to the left by the solenoid devices controlling valve 36. Valve 38 is again in a direction to the right as viewed in FIG. 5A. This position of the valves 36 and 38 as well as the position of the push buttons allows appropriate fluid pilot pressure flow to present pressure at pressure points A, D, E, G1, and G2 as indicated in FIG. 5A and the corresponding points in FIGS. 5B, 5C, and 5D.

Figure 5B:
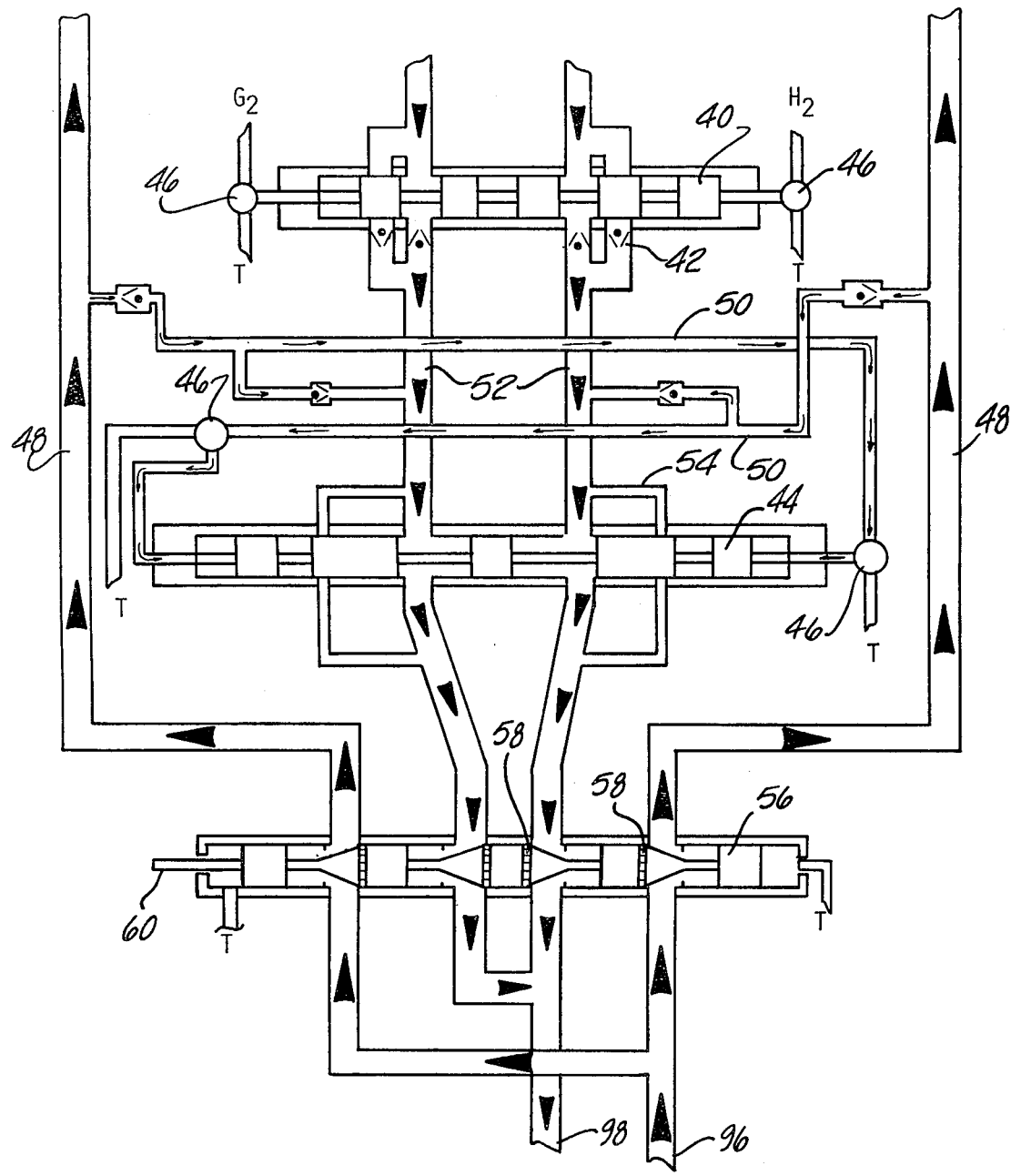
FIG. 5B shows the positive traction and differential device of the present invention in a situation where the vehicle is travelling straight ahead with typical fluid flow to the torque motors.

FIG. 5B shows the differential device and positive traction device of the present invention in the same position as that shown for FIG. 2B but with large arrows depicting a high rate of fluid flow through the forward mode supply lines 48 and a somewhat reduced pressure through the return lines 52. The reduced pressure is attributed to the pressure drop across the torque motors.

As indicated, both the differential spool valve 56 and the positive traction spool valve 44 are in their center position allowing flow through the lines as indicated.

Figure 5C:
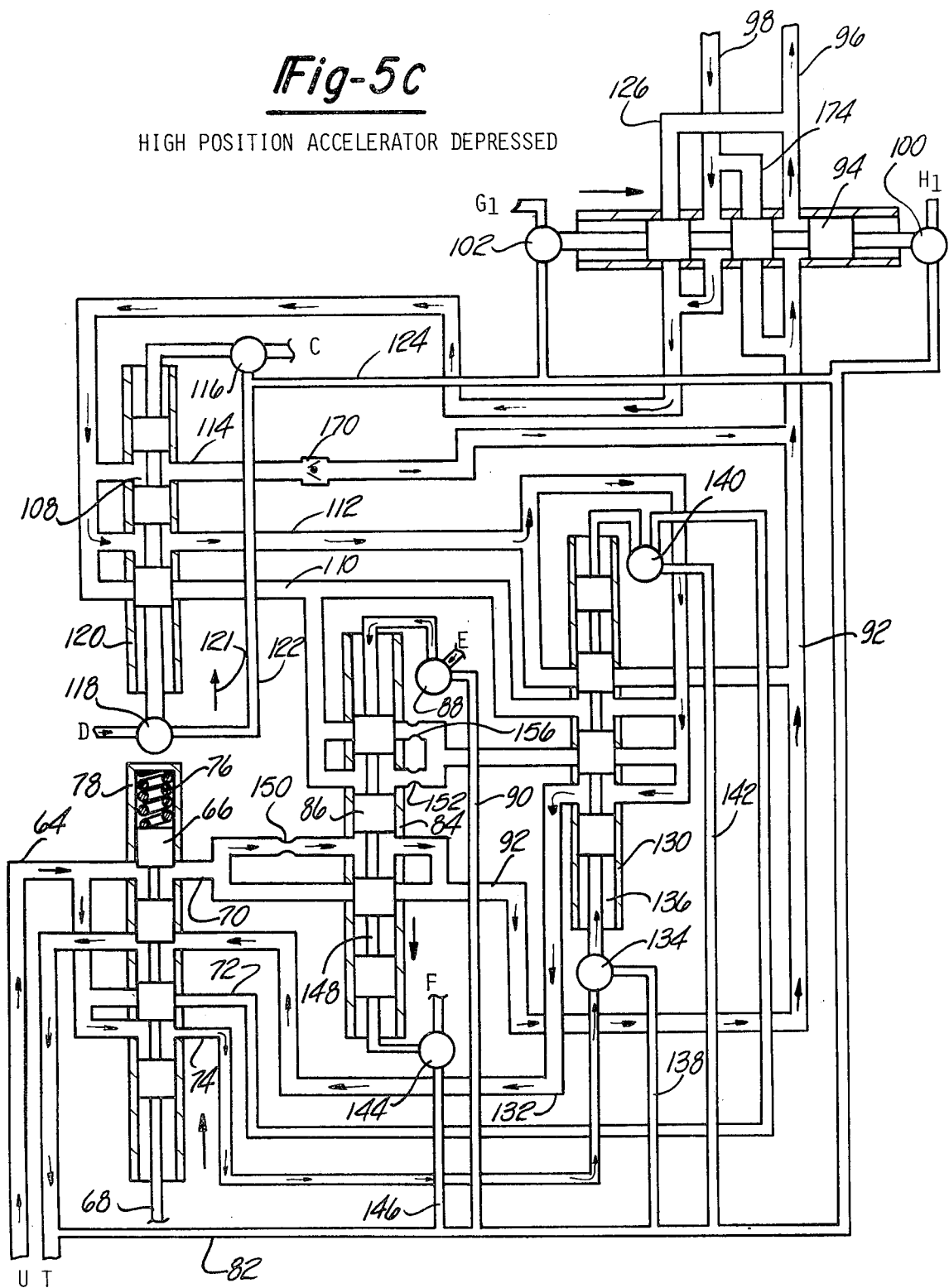
FIG. 5C shows the transmission device according to the present invention with the control spool valves in position for the high control range wherein little additional pressurized fluid is admitted to the drive motors and a substantial portion of fluid is recirculated to the drive motors through the upper circuits, that is, with the accelerator depressed slightly.

Referring now to FIG. 5C, the transmission device of the present invention is there depicted in the high control range position with the accelerator depressed. Since the accelerator is depressed, spring 76 is compressed and fluid is allowed to flow from supply line 64 to main line 70 and, because of the position of valve 86, through orifice 150 and supply line 92 as indicated by the arrows in FIG. 5C. When the transmission device of the invention is in the high control range as indicated in FIG. 5C, flow through the orifices 156 and 152 as well as flow through the top portion of valve 86 is prohibited by the position of valve 108 and kick-down valve 128.

Since pressure point D rather than pressure point C receives pilot fluid pressure to valve 118, valve 108 is in a raised position as viewed in FIG. 5C, thus allowing fluid flow through line 112 and out the return flow line 132 as indicated by the arrows in FIG. 5C. Although pressurized fluid is presented to check valve 170 from line 114 after passing through spool valve 108, fluid does not flow through check valve 170 to supply line 92 because the fluidized pressure from line 92 is greater than the pressure in line 114 thereby closing check valve 170.

Figure 5D:
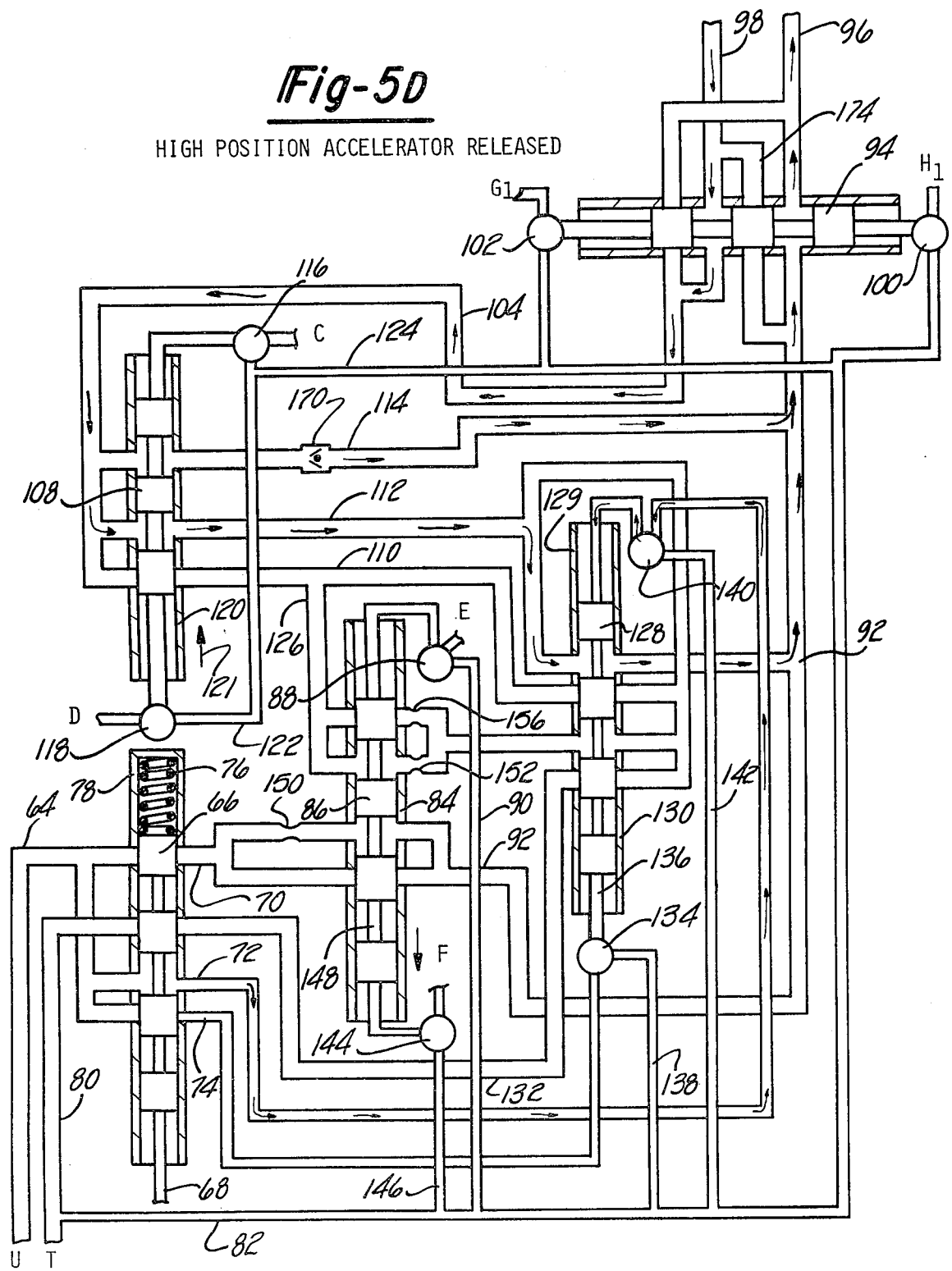
FIG. 5D shows the transmission device according to the present invention with the accelerator released wherein all of the fluid to the drive motors is recirculating to the circuits as shown by the arrows.

FIG. 5D shows the transmission device of the present invention in the high control range but with the accelerator released thereby expanding spring 76 to close off the supply of pressurized fluid to all lines except pilot control line 72 which effectuates movement of kick-down valve 128 to the position indicated. When the transmission device is in the high control range indicated but without the accelerator depressed, fluid flows through spool valve 108, through check valve 170, and returns to supply line 92 in a recirculation of fluid. Some fluid also flows through spool valve 108 to recirculation line 112, through kick-down valve 128, and back to supply line 92 as indicated.

Unlike the low control range and second control range indicated in FIGS. 3D and 4D, respectively, wherein the accelerator is shown as released, there is no return flow of fluid through either the somewhat restricted orifice 152 or the very restricted orifice 156. Thus, when the vehicle is in the high control range indicated in FIG. 5D, the torque motors are not pumping against a pressure head but merely recirculating the fluid according to the arrows as indicated. Thus, in the high control range, there is not as great a braking effect on the driven wheels of the vehicle as in the second control range or low control range depicted in FIGS. 4D and 3D, respectively. Of course, when the vehicle slows to a predetermined speed, the solenoids associated with valve 36 move spool valve 36 to the right to place the transmission back in the second control range.

Figure 6A:
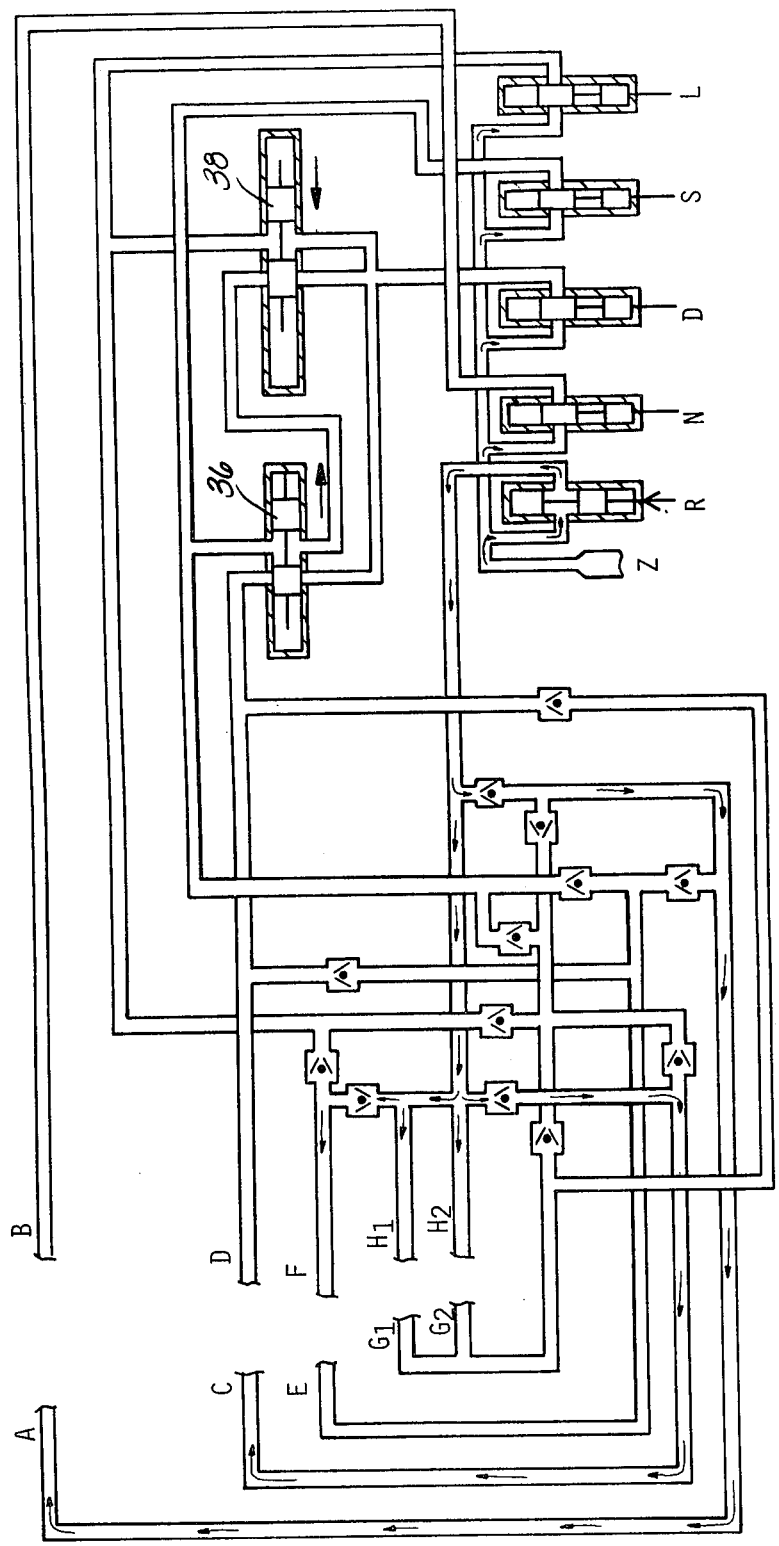
FIG. 6A shows the shifter mechanism according to the present invention in the reverse position.

FIG. 6A shows the push button shifter selector of the present invention with the reverse push button depressed, thereby allowing fluid pressure from the source Z directly to pressure points A, C, F, H1, and H2 as indicated, bypassing the spool valves 36 and 38 in a similar manner to that for the situation represented by FIG. 3A where the low control range push button is depressed.

Figure 6B:
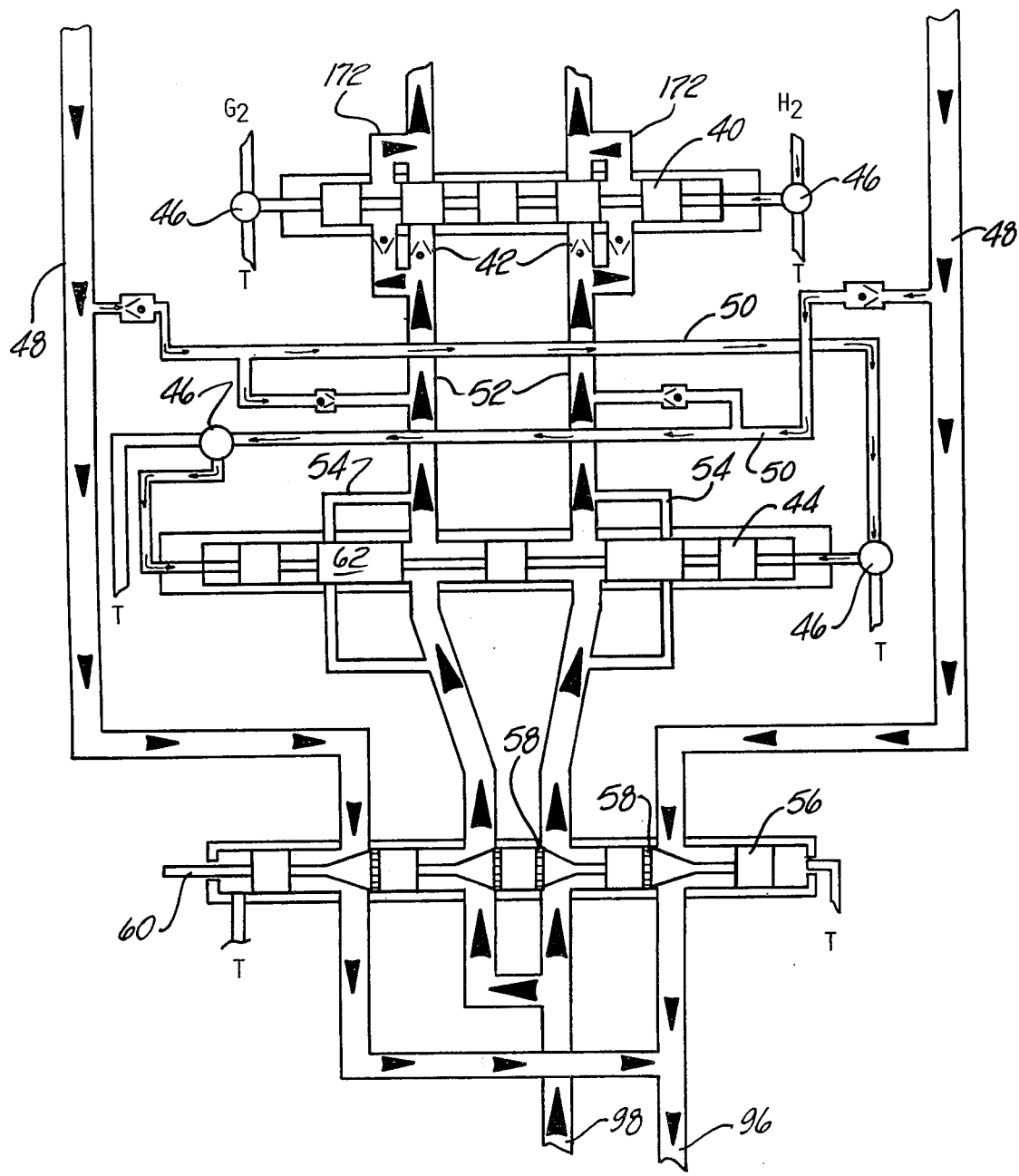
FIG. 6B shows the positive traction and differential devices according to the present invention with the fluid flow in the reverse direction.

FIG. 6B shows the positive traction device and differential device of the present invention but depicting fluid flow through main line 52 to the torque motors and back through lines 48. Both the differential device and positive traction device are shown in the central position; i.e., without a wheel spin and without a turn. However, since fluid under pressure is supplied to pressure point H2 through valve 46, spool valve 40 is shifted to a position to the left as viewed in FIG. 6B thereby directing the flow of fluid through the auxiliary circuit paths 172 as indicated. The check valves 42 are provided to assure proper flow to the torque motors regardless of the supply of pressurized fluid to the torque motors.

Figure 6C:
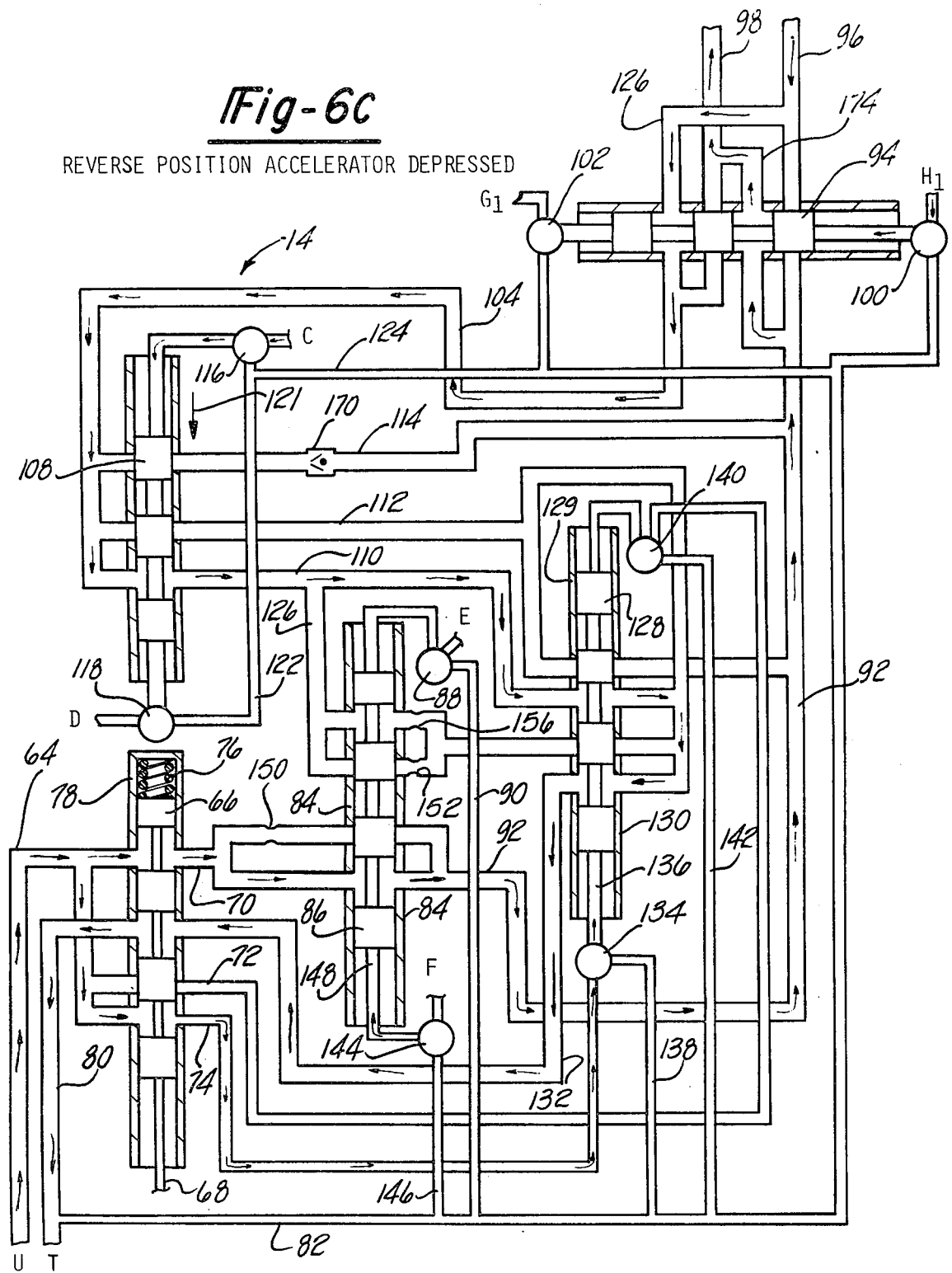
FIG. 6C shows the transmission device according to the invention with the reverse valve shifted to divert the flow of fluid in the opposite direction through the torque motors.

FIG. 6C represents the transmission device of the present invention in the reverse mode of operation with the accelerator depressed, thus admitting fluid under pressure from main line 64 through main supply line 70 in the same manner as indicated for the low position with the accelerator depressed as shown in FIG. 3C. However, unlike FIG. 3C, pilot fluid pressure is now directed to pressure point H1 through valve 100, to shift spool valve 94 to a leftward position as viewed in FIG. 6C, thereby directing fluid flow through bypass circuit 174 rather than through main supply line 96 as indicated in FIG. 3C. Similarly, fluid returns from the torque motors, differential device, and positive traction device shown in FIG. 6B through line 96 and across bypass return circuit 174. Thereafter, flow is through spool valve 94 as indicated and the flow of fluid is controlled in the same manner as in FIG. 3C.

Figure 6D:
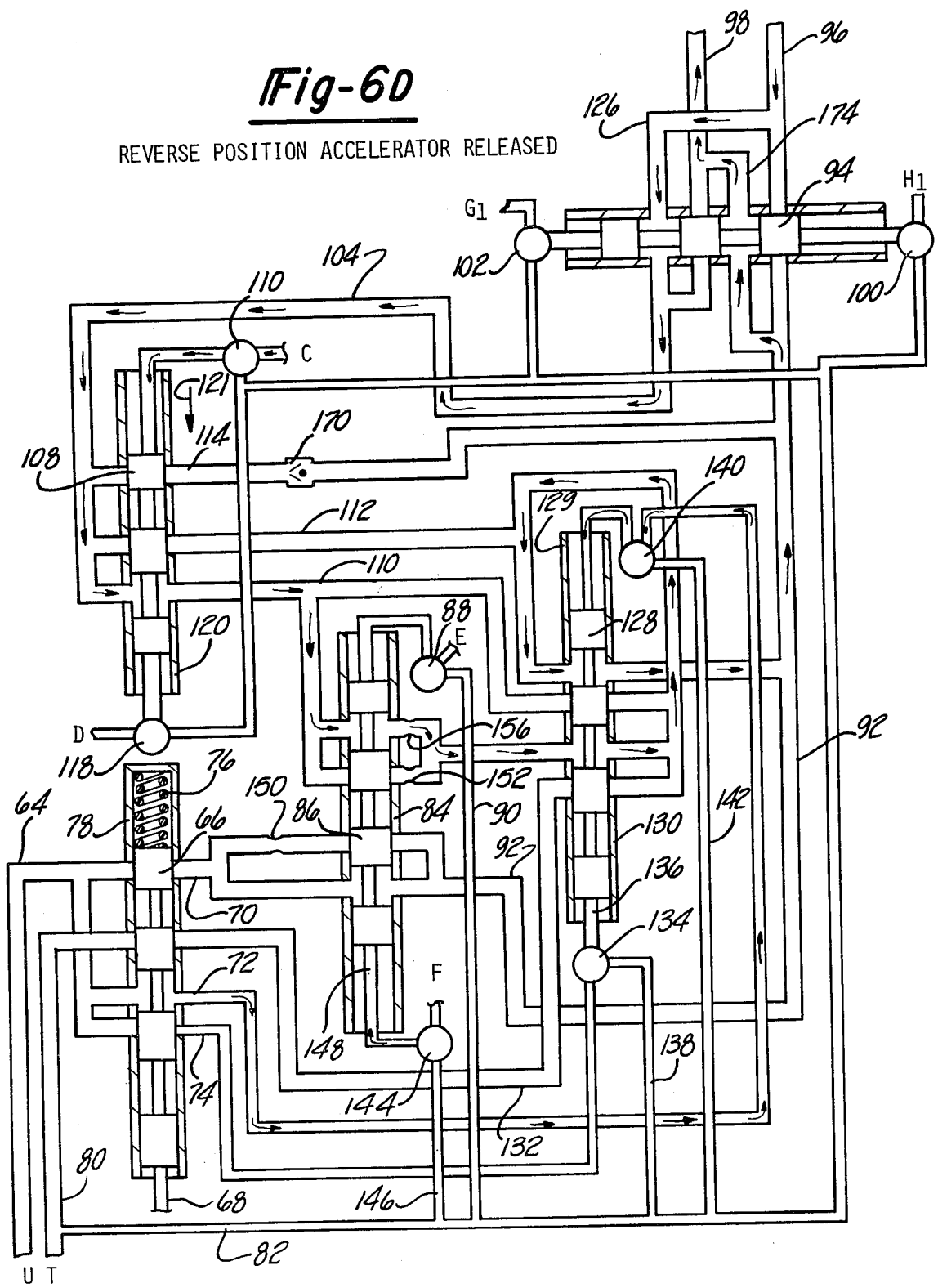
FIG. 6D shows the transmission device according to the present invention and in the reverse mode with the accelerator released whereby fluid is recirculated in the opposite direction to the torque motors.

FIG. 6D shows the transmission device of the present invention with the vehicle in the reverse mode of operation and with the accelerator released, thereby extending spring 76 to close the flow of fluid through all lines except pilot line 72 which effectuates movement of the kick-down valve 128 in the manner indicated above for deceleration in the forward mode. With the exception of the return of fluid flow through alternative crossover flow line 126 to the return line 104, the recirculation of fluid to the torque motors for the reverse mode of operation is otherwise the same as for the forward mode of operation when the vehicle is in the low control range as indicated in FIG. 3D.

The important feature of the recirculation in the low and reverse control range is that flow is directed through greatly restricted orifice 156 as indicated such that the torque motors are pumping fluid against a substantial pressure head to effect braking of the driven wheels. It is again noted that this braking action is a subsatntial improvement over devices of the prior art, especially for turbine engines where a braking means has not been achieved for turbines, so as to increase their efficiency. The present invention will increase the overall efficiency and the operation of turbine engines for automobiles including trucks and passenger cars.

Referring now to FIG. 7, pressure is supplied from pump 20 to both the main supply lines of the invention and also to the pilot pressure lines of the invention. Fluid from the pump is directed to a low pressure relief valve 176 which dumps fluid to line 192 at a predetermined low pressure. The relief valves 176 and 180 shown in FIG. 7 are of the same general design as accumulators also depicted in FIG. 7 but have a mechanism which dumps all fluid accumulated therein when a predetermined pressure has been reached. Such devices are well known in the art for use in a single line but not for use in the manner indicated in the present invention. When fluid is dumped or flowed through low pressure relief valve 176 to high pressure relief valve 180, a constant pressure is provided to line 194 whether fluid is allowed to flow to accumulators 182 and 184 or blocked by valve 186 according to the position of the transmission shifter selector which provides pilot fluid pressure to either pressure point A or pressure point B. If the predetermined pressure in high pressure relief valve 180 is reached, then the fluid is dumped back to the tank or reservoir 24 as indicated.

Although the accumulators 178, 202 are shown to be spring loaded, dry nitrogen bladders may also be used in the place of the springs to operate in a similar manner wherein the nitrogen bladders are compressed with increasing fluid pressure to the accumulators. The accumulators shown and the dry nitrogen bladders mentioned are similar to devices found in conventional hydraulic automatic transmissions.

As indicated in FIG. 2A, pressure is supplied to pressure point B only when the neutral push button is depressed to allow flow to pressure point B. Thus, additional fluid under pressure from pump 20 is provided to accumulator 182 and 184 whenever the transmission shifter selector has any of push buttons reverse, drive, second, or low depressed. In that situation, fluid would flow through spool valve 186 such as is shown by the position shown in FIG. 7.

However, when the transmission shifter selector is in the neutral position, valve 186 is moved to its leftward position contrary to that shown in FIG. 7 to close off line 196 leading to the accumulators, thereby directing all fluid flow from pump 20 back to the reservoir 24 by way of line 198. Check valves 200 are provided for flow to and from accumulators 182 and 184 in parallel relationship so as to provide a constant fluid pressure to point U which corresponds to point U in the drawing figures representing the transmission device of the invention; i.e., FIGS. 3C, 3D, 4C, 4D, etc.

Although springs 202 are shown as used in the accumulators and 204 as used in the relief valves of FIG. 7, it is also known to use dry nitrogen bladders for this purpose. Other suitable means for retaining pressure in line 206 and the other lines of FIG. 7, is acceptable so long as a relatively constant pressure is provided to point U.

A single spring loaded accumulator 178 is represented in FIG. 7 as providing pilot pressure to point Z. Point Z is also reflected in the drawings of the shifter selector system; i.e., FIGS. 2A, 3A, etc.

Although not described in detail herein, it is also possible to provide an engine regulator sensitive to the use of pressurized fluid from the accumulators. Such a device acts as an accelerator for the engine but is only indirectly controlled by the vehicle accelerator since it is responsive to fluid requirements. The regulator may be set to merely switch the engine on and off, in which case the engine can be preset to run at a predetermined rate with a constant fuel flow. Alternatively and preferably, the regulator may provide a variable control to increase or decrease the fuel flow rate to the engine in accordance with the fluid requirements of the system.

This feature is particularly advantageous with my inventive engine described in U.S. patent application Ser. No. 142,022. In that case, both the fuel and water supply to the engine are regulated.

Figure 8:
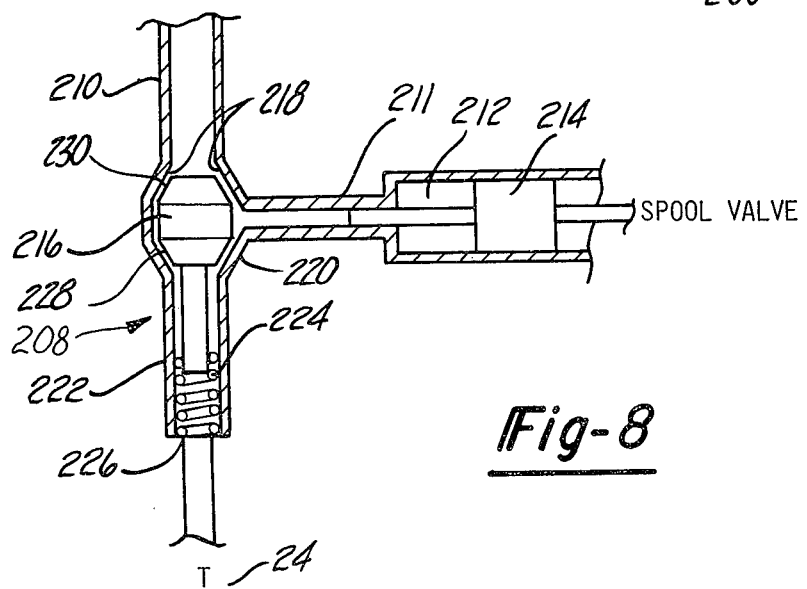
FIG. 8 is a schematic representation of the novel fluid flow check valve of the present invention.

Referring now to FIG. 8, the novel fluid control valve of the invention is thereshown generally at 208. Fluid under pressure may be directed to a pressure point associated with the fluid control valve to line 210. Additionally, fluid may be forced from chamber 212. Fluid pressure may be presented to connecting line 211 from chamber 212 by movement of associated spool valve 214.

Movement of spool valve 214 to the left would be effected by a flow of fluid pressure from the opposite end of spool valve 214 as indicated in the manner for corresponding pressure points, such as A and B of FIG. 7 or G2, H2 of FIG. 2B, for example.

Valve 208 has a central sealing member 216 which can seal against the conforming walls 218 of input line 210 or the conforming walls 220 of output line 222. Central seal 216 is supported and biased to an upward position as viewed in FIG. 8 by a spring 224 or equivalent device mounted against the stop 226 of line 222. Fluid flow continues to the reservoir 24 from line 222.

Thus, when fluid under pressure is presented in line 210, seal 216 is compressed against spring 224 to seal against conforming walls 220 with its lower conforming surfaces 228. Although an octagonal shape is shown for the seal 216, a spherical or other shape is also suitable so long as sealing is effected against walls 218 and 220 when the appropriate pressure flow is presented. Since seal 216 is moved to a lower position against walls 220, fluid pressure is directed from line 210 into connecting line 211 to present fluid under pressure in chamber 212. This fluid under pressure in chamber 212 moves spool valve 214 in a direction to the right as viewed in FIG. 8.

When another mode of operation is effected by other movement of the valves 36, 38 in the transmission shifter selector or by depression of a different pushbutton in the transmission shifter selector, then fluid pressure may be directed to an opposite end (not shown) of spool valve 214. Movement of spool valve 214 to the left as viewed in FIG. 8 effects a fluid pressure from chamber 212 to connecting line 211. Since no pressure head is present in fluid line 210, the biasing force of spring 224 moves seal 216 to a raised position such that sealing surfaces 230 seal against upper walls 218 in the housing of valve 208. Thus, fluid is dumped from chamber 212 through connecting line 211 and past spring 224 to the reservoir 24. In this manner, spool valves of the invention may be moved from left to right by fluid pressure in accordance with the fluid delivered to the pressure points as indicated in any of the drawing figures representing the transmission shifter selector system. Other uses may also be made of valve 208.

Figure 9:
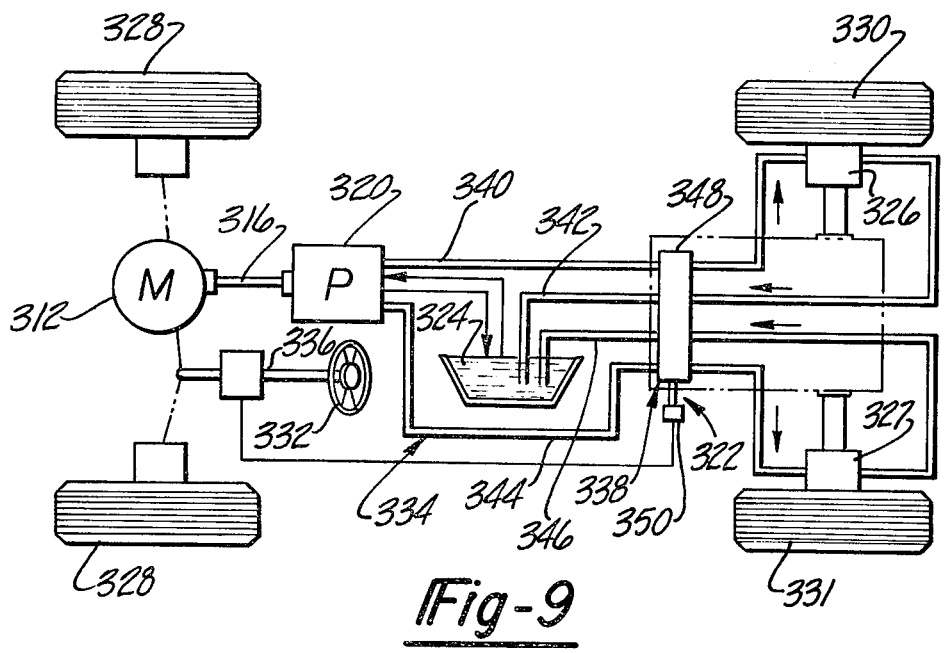
FIG. 9 is a schematic view of the hydraulic differential according to the present invention, shown isolated from the transmission and positive traction circuitry of the present invention, for clarity.
Figure 10:
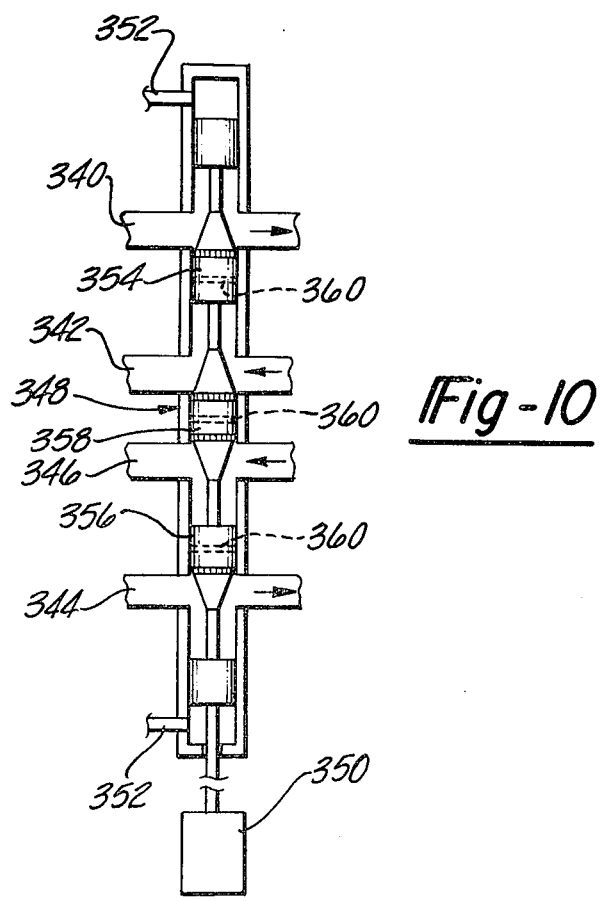
FIG. 10 shows the differential circuitry of the present invention similarly isolated, wherein the vehicle is in neither a left nor right turn.

Referring now to FIGS. 9 and 10, a hydraulic differential device 322 is shown in a vehicle 310, isolated from the transmission and positive traction devices of the present invention, for clarity. The vehicle 310 comprises a right wheel 330 driven by a right torque motor 326, and a left wheel 331 driven by a left torque motor 327. A pair of front wheels 328 may or may not be similarly driven as desired. A circuit means 334 delivers fluid under pressure to the torque motors 326 and 327, and returns the fluid to a reservoir 324. A pump 320 draws fluid from the reservoir 324 and is driven by a vehicle engine 312 via a drive shaft 316. A steering wheel 332 is operatively connected to the driven wheels 330 and 331 by a means 336 for sensing the turning of the steering wheel 332, and to the front wheels 328 in a similar or other fashion, known or otherwise.

The hydraulic differential 322 comprises the turn sensing means 336, and a flow directing means 338 disposed in the circuit means 334, for increasing the flow of fluid to one of the torque motors 326 or 327 while simultaneously decreasing the flow to the other by a corresponding amount. The flow directing means 338 is controlled by the turn sensing means 336 such that the directing means 338 provides an increased torque to the left wheel 331 when the steering wheel 332 is turned to the right, and an increased torque to the right wheel 330 when the steering wheel 332 is turned to the left.

The circuit means 334 preferably comprises a first hydraulic passage 340 to the right torque motor 326, a second hydraulic passage 342 from the right torque motor 326 to the reservoir 324, a third hydraulic passage 344 from the pump 320 to the left torque motor 327, and a fourth hydraulic passage 346 from the left torque motor 327 to the reservoir 324.

The flow directing means 338 first comprises a spool valve 348 disposed in all of the passages 340, 342, 344 and 346. The spool valve 338 comprises a first tapered spool 354 positioned substantially in the first passage 340, a second tapered spool 356 positioned in substantially the third passage 344, and a third spool 358 connected between the first spool 354 and the second spool 356. The third spool is tapered at each end and disposed substantially in both the second passage 342 and the fourth passage 346.

The flow directing means 338 also comprises a means 350 for moving the spool valve 348 across the passages 340, 342, 344 and 346, so as to regulate the flow of fluid to and from the torque motors 326 and 327, for the turning thereof. The spool valve 348 can be moved to successive positions between the extreme right (upwards in FIG. 10) and the extreme left (downwards), so as to present more of the first tapered spool 354 and the third tapered spool 358 in the first hydraulic passage 340 and the second passage 342, and thereby decrease the fluid flow therethrough, for a left turn; and also so as to present more of the second and third spools 356 and 358 in the third and fourth passages 344 and 346, and thereby decrease the flow therethrough, for a right turn. A pressure take off 352 is provided to ease movement of the spool valve 348, similar to those shown at the ends of the valve 56 in FIG. 2B.

Preferably, each of the spools 354, 356 and 358 is provided with a small flow passage 360 therethrough, so that a predetermined mininum rate of flow of fluid to and from each torque motor 326 and 327 is allowed.

The valve moving means 350 can comprise an electro-mechanical means such as a solenoid. Alternatively, the valve moving means can comprise a hydraulic pilot duct comprising a pair of the pressure take offs 352 supplied by the pump 320 and fluidly communicating with the spool valve 348.

A typical example of the size of the hydraulic lines for automobiles according to the invention would be that of a semi-truck which would have, for example, a two-inch diameter hydraulic lines. A conventional passenger automobile would, of course, have smaller lines and the entire transmission, differential, and positive traction device would easily be formed in a casing equivalent in size to a small suitcase.

Not shown in the drawing of vehicle 10 is a park device used to assure that the vehicle will not move when it is stopped. A mechanical park device suggested for use with the present invention would be one wherein a lever in the compartment of the vehicle may be moved to slide lock pins into the mechanism of the torque motors to prevent rotation of the torque motors. It can be readily appreciated that other hydraulic devices may be operated off the hydraulic pump and system of the present invention. Included among such features would be the power steering and power brakes on conventional passenger cars and trucks. However, the alternator or other generator devices should be driven or geared off the shaft of the engine 12.

OPERATION

The operation of a vehicle equipped with the transmission, differential, and positive traction device of the present invention will now be briefly described so as to more fully explain the operation of the invention.

When the operator of the vehicle first starts the engine of the vehicle to start rotation of the drive shaft and operation of pump 20, the shifter selector system remains in a neutral position until appropriate pressure has been achieved at point U as depicted in FIG. 7 and the drawing figures representing the transmission device of the invention. An appropriate sensing device may be positioned in line 206 to detect when this condition has been achieved.

When the condition is initially achieved, spool valve 186 is in a position moved to the left of that shown in FIG. 7 such that fluid is dumped through line 198 back to reservoir 24 until required for driving the vehicle.

The following description describes operation of the vehicle in an automatic manner that is comparable to a conventional automatic transmission where shifting from low control range to second control range to high control range is achieved without manually operating the device. Thus, when the operator of the vehicle is ready to proceed in the forward mode, the drive button of the shifter selector system is depressed. Since the vehicle is either not moving or moving at a very slow speed, the speedometer system provides an input to actuate the appropriate solenoids associated with spool valves 36 and 38 to move them to the positions indicated in FIG. 3E; i.e., valve 36 moves to the right, and valve 38 moves to the left as depicted in FIG. 3E. This provides pilot fluid pressure to pressure points A, C, F, G1, and G2. Thereafter, depression of the accelerator pedal of the vehicle opens throttle valve 66 to place the transmission device in the condition indicated in FIG. 3C and to place the differential device in the position indicated in FIG. 3B. Of course, the positive traction device would be in a centrally located position unlike that shown in FIG. 3B since it is assumed that the vehicle is not mired or otherwise stuck such that it would experience a wheel spin.

If, after the vehicle has reached a relatively slow speed in the low control range, the accelerator is released, then the spool valves of the transmission will move to the position indicated in FIG. 3D. That is, the kick-down valve 128 and the throttle valve 66 will more to the lower position as viewed in FIG. 3D. At that point, the torque motors of the vehicle will be pumping fluid to the circuit indicated by the arrows in FIG. 3D including past the greatly restricted orifice 156. As indicated above, this effects a braking action on the vehicle and assists in stopping the vehicle rapidly.

If, after the vehicle reaches a relatively slow predetermined speed, the accelerator remains depressed, then the speedometer system transmits a signal actuating the solenoid associated with the left end of spool valve 38 as viewed in FIG. 4E, thus moving spool valve 38 to the right as viewed in FIG. 4A. Movement of spool valve 38 in the manner indicated provides pilot fluid pressure to pressure point E rather than pressure point F. Providing pilot fluid pressure to pressure point E through valve 88 moves spool valve 86 such that fluid is now directed past orifice 150 from line 70 to supply line 92. However, the return flow of fluid through line 110 does not pass through either of orifices 156 or 152 but rather returns through kick-down valve 128 to the reservoir 24. The vehicle will proceed with the transmission device in the condition indicated in FIG. 4C so long as the accelerator is depressed and the vehicle has not reached a second predetermined speed which would change the position of spool valve 36 of the shifter system into high control range.

If the accelerator is released while the vehicle is proceeding in the second control range, and the throttle valve and kick-down valve change to the positions indicated in FIG. 4D such that no fluid under pressure is admitted to the transmission device, then the return flow of fluid from line 110 is directed through the somewhat restricted orifice 152 to provide a pressure head for braking of the vehicle as indicated above. Thereafter, the fluid flows through the circuitry indicated by the arrows and back to the torque motors for recirculation.

When the vehicle reaches a second predetermined speed, the speedometer means actuates the solenoid on the right end of spool valve 36 to move spool valve 36 to a leftward position as viewed in FIG. 5A thereby presenting pilot fluid pressure to pressure points A, D, E, G1 and G2 at the corresponding points indicated on FIGS. 5B, 5C, 5D, and 7. Since pilot fluid pressure is provided to pressure point D and valve 118 rather than to pressure point C and valve 116, spool valve 108 is moved to its upward position as viewed in FIG. 5C and indicated by the arrow 121. Movement of valve 108 merely redirects the return flow of fluid from line 110 to line 112 and eventually back to return line 132 and reservoir 24. The only difference between the return flow in second position and in high position when the accelerator is depressed is that the fluid is returned to only one portion of kick-down valve 128.

There is a significant difference between the condition of the transmission device of the invention for high position and the condition of the device for the second control range when the accelerator is released. Releasing the accelerator of the vehicle not only prevents the flow of fluid through the throttle valve 66 but also moves the kick-down valve 128 to a position which returns fluid to main supply line 92 by way of line 112 and through kick-down valve 128. This is distinguished from the condition of the transmission device in the second control range when the accelerator is released. In the latter situation, the return flow of fluid is presented to the somewhat restricted orifice 152 to present a pressure head against the fluid pumped by the torque motors at the driven wheels.

In the high position, no such pressure head is presented and a "free wheeling circuit" is available for fluid to flow back to the torque motors through line 92 and 96 and eventually through the differential device. Thus, the only pressure head against which the torque motors must pump when the accelerator is released while the transmission is in the high control range is that associated with the flow of fluid through the circuitry indicated by the arrows in FIGS. 5B and 5D. This effects very little braking action on the motor and the vehicle is, in comparison to the low control range and second control range, allowed to "free-wheel" somewhat.

It can readily be appreciated that the low push button and second control range push button of the transmission shifter selector may be used in the same manner as the low and second gears of a conventional automatic transmission. For example, the second control range may be selected for descending a steep hill to control the speed of the vehicle due to the braking of the system. The low control range may be used similarly or used for other purposes in the same manner as is done with a conventional geared hydraulic transmission device available in the prior art.

When it is desired to turn the vehicle, the steering wheel 332 is turned in the conventional manner. When the steering wheel is turned to the right, the valve moving means 350 will be activated by the sensing means 336 and will move the differential spool valve 348 to the right (upwards in FIG. 10). The flow of fluid to the right torque motor 326 will be decreased as the spool valve 348 reaches its extreme position. The fluid flow to the left torque motor 327 will be accordingly increased, with the result that the vehicle will be given a differential assist for the right turn. Similarly, turning the steering wheel 332 to the left will result in a differential assist for a left turn, when the spool valve 348 reaches the other extreme position.

A detailed description of the operation of a vehicle using the present invention in the reverse mode is not made herein since such operation can be readily understood by referral to FIG. 6A to determine the position of valves 36 and 38 as well as the determination of which pressure points have fluid pressure presented thereto to operate the spool valves of the differential, positive traction, and transmission device of the invention.

It is also possible to provide a "passing gear" means for use with the present invention. In addition to the circuitry shown for the transmission, a switch (not shown) is provided at the accelerator. The switch is actuated when the accelerator is completely depressed and the shifter selector is in Drive. Actuation of the switch at the accelerator transmits a signal which moves spool valves 36, 38 to the position shown in FIG. 3E. As a result the transmission is put into the low control range as shown in FIG. 3C. Bypassing orifice 150 provides additional fluid flow (note spool valve 86) to the torque motors and a burst of power for passing.

If a two-speed axle is employed with the torque motors, the two-speed axle is either electrically or hydraulically controlled to maintain the proper ratio for high rates of revolution.

Thus, the present invention is capable of providing many of the same features of a conventionally equipped automobile.

The preferred embodiment of the invention is preferably formed in an encased layered structure having flow lines formed of mating grooves in adjacent layers. In this manner, the fluid flow may be directed through the layers of the encased device from the transmission to the differential to the positive traction device so as to save a considerable amount of space in mounting the transmission, differential, and positive traction devices of the present invention in the structure of a vehicle. Furthermore, such an embodiment results in substantial savings in the provision of high pressure hydraulic lines between the transmission and differential as well as between the differential and the positive traction device.

A clutch plate mechanism or similar device could be made available to block the flow of fluid from the accumulators and line 206 to the throttle valve 66 to assure that no pressurized fluid is available to the transmission device or throttle motors when the system is in neutral. In other words, it is necessary to insure that the accumulators 182 and 184 do not dump pressurized fluid into the system and drive the torque motors when the vehicle is in neutral. This constitutes an additional safety device for the present invention.

The relative size of orifices 150, 152, and 156 may be adjusted according to the system as desired, but orifice 156 is greatly restricted in comparison to orifice 152 so as to effect the proper pressure head for the torque members in the given low and second control ranges. For example, orifices 150 and 152 may typically be of one-half diameter of the flow lines associated therewith whereas orifice 156 is substantially reduced to approximately one-fourth the diameter of the flow lines.

Having described my invention, it will become apparent to those skilled in the art to vary some aspects of the invention including the relative dimensions of orifices, delivery of fluidized pressure to pressure points for movement of spool valves, direction of fluid flow in delivery lines by means other than spool valves depicted, and various other aspects of the invention without departing from the scope or spirit of the invention as above described.

Therefore, what I claim is:

1. In a vehicle having a right wheel driven by a right torque motor, a left wheel driven by a left torque motor, a steering wheel operatively connected to said driven wheels, a reservoir of hydraulic fluid, a pump drawing fluid from said reservoir and being driven by the engine of the vehicle, and circuit means delivering fluid under pressure to the torque motors and returning the fluid to the reservoir, a hydraulic differential device comprising:

means for sensing turning of the steering wheel; and means disposed in said circuit means for increasing the flow of fluid to one of said torque motors and simultaneously decreasing the flow of fluid to the other of said torque motors by a corresponding amount, said flow directing means being controlled by said turn sensing means such that a right turn applies increased torque to the left wheel and a left turn applies increased torque to the right wheel.

2. The invention as defined in claim 1 wherein said circuit means has a first hydraulic passage to said right torque motor, a second hydraulic passage from said right torque motor to said reservoir, a third hydraulic passage to said left torque motor from said pump, and a fourth hydraulic passage from said left torque motor to said reservoir and wherein, said flow directing means comprises a spool valve disposed in all of said passages and means for moving said spool valve across said passages so as to regulate the flow of fluid to and from said torque motors for turning.

3. The invention as defined in claim 2 wherein said valve moving means comprises a pilot hydraulic duct supplied by said pump and fluidly communicating with said spool valve.

4. The invention as defined in claim 2 wherein said spool valve comprises:

a first tapered spool positioned substantially in said first passage;

a second tapered spool positioned substantially in said third passage; and a third spool connected between said first spool and said second spool, tapered at each end, and disposed substantially in both said second passage and said fourth passage, whereby said spool valve may be moved to successive positions between extreme right and extreme left to present more of said first and third spools in said first and second passages to decrease fluid flow therethrough for a left turn and, for a right turn, to present more of said second and third spools in said third and fourth passages to decrease fluid flow therethrough.

5. The invention as defined in claim 2 wherein said valve moving means is electrical-mechanical.

6. The invention as defined in claim 4 wherein each of said spools has a small flow passage therethrough, each said flow passage allowing a predetermined minimum fluid flow rate to and from each torque motor.

* * * * *

UNITED STATES PATENT AND TRADEMARK OFFICE
CERTIFICATE OF CORRECTION

PATENT NO. : 4,484,655
DATED      : November 27, 1984
INVENTOR(S) : Darrel J. Sheppard, Sr.

It is certified that error appears in the above-identified patent and that said Letters Patent is hereby corrected as shown below:

Column 3, line 52-53, delete "real-tively" insert --relatively--.

Column 16, line 66 delete "subsatntial" insert --substantial--.

Column 21, line 2 delete "more" insert --move--.

Signed and Sealed this

Thirtieth Day of July 1985

[SEAL]

Attest:

DONALD J. QUIGG

Attesting Officer

Acting Commissioner of Patents and Trademarks